US009367551B2

(12) United States Patent
Beaverson et al.

(10) Patent No.: US 9,367,551 B2
(45) Date of Patent: Jun. 14, 2016

(54) FILE SYSTEM ACCESSING AN OBJECT STORE

(71) Applicant: SimpliVity Corporation, Westborough, MA (US)

(72) Inventors: Arthur J. Beaverson, Boxborough, MA (US); Paul Bowden, Berlin, MA (US)

(73) Assignee: SimpliVity Corporation, Westborough, MA (US)

( * ) Notice: Subject to any disclaimer, the term of this patent is extended or adjusted under 35 U.S.C. 154(b) by 283 days.

(21) Appl. No.: 13/932,297

(22) Filed: Jul. 1, 2013

(65) Prior Publication Data

US 2013/0290263 A1 Oct. 31, 2013

Related U.S. Application Data

(63) Continuation of application No. 12/823,922, filed on Jun. 25, 2010, now Pat. No. 8,478,799.

(60) Provisional application No. 61/269,633, filed on Jun. 26, 2009.

(51) Int. Cl.
*G06F 17/30* (2006.01)

(52) U.S. Cl.
CPC .... *G06F 17/30091* (2013.01); *G06F 17/30097* (2013.01); *G06F 17/30156* (2013.01); *G06F 17/30949* (2013.01); *G06F 17/30952* (2013.01)

(58) Field of Classification Search
CPC ................... G06F 17/30091; G06F 17/30097; G06F 17/30156; G06F 17/30949; G06F 17/30952
See application file for complete search history.

(56) References Cited

U.S. PATENT DOCUMENTS

| 6,912,645 | B2 | 6/2005 | Dorward et al. |
| 7,062,490 | B2* | 6/2006 | Adya ................ G06F 17/30094 707/999.01 |
| 7,266,555 | B1* | 9/2007 | Coates ............. G06F 17/30132 707/827 |
| 7,328,217 | B2 | 2/2008 | Borthakur et al. |
| 7,454,592 | B1 | 11/2008 | Shah |
| 7,877,426 | B2 | 1/2011 | Grubbs et al. |
| 8,195,636 | B2 | 6/2012 | Stager et al. |
| 8,560,503 | B1* | 10/2013 | McManis ................ G06F 17/00 707/640 |
| 2002/0194209 | A1* | 12/2002 | Bolosky ............ G06F 17/30097 707/999.2 |
| 2004/0148306 | A1 | 7/2004 | Moulton |
| 2006/0036898 | A1 | 2/2006 | Doering et al. |
| 2006/0294163 | A1* | 12/2006 | Armangau ........ G06F 17/30091 707/999.205 |

(Continued)

FOREIGN PATENT DOCUMENTS

| EP | 2 433 226 B1 | 12/2015 |
| JP | 2007-305122 A | 11/2007 |

OTHER PUBLICATIONS

International Search Report and Written Opinion in related application PCT/US2010/039966 dated Nov. 10, 2010.
(Continued)

*Primary Examiner* — Scott A Waldron
(74) *Attorney, Agent, or Firm* — Therese Hendricks, Esq.

(57) ABSTRACT

A digitally signed file system in which data, metadata and files are objects, each object having a globally unique and content-derived fingerprint and wherein object references are mapped by the fingerprints; the file system has a root object comprising a mapping of all object fingerprints in the file system, such that a change to the file system results in a change in the root object, and tracking changes in the root object provides a history of file system activity.

12 Claims, 24 Drawing Sheets

(56) References Cited

U.S. PATENT DOCUMENTS

| | | | |
|---|---|---|---|
| 2007/0094312 A1* | 4/2007 | Sim-Tang | G06F 17/30085 707/999.204 |
| 2007/0266059 A1 | 11/2007 | Kitamura | |
| 2008/0228691 A1 | 9/2008 | Shavit et al. | |
| 2008/0270436 A1 | 10/2008 | Fineberg | |
| 2009/0037456 A1 | 2/2009 | Kirshenbaum | |
| 2009/0271402 A1* | 10/2009 | Srinivasan | G06F 17/3015 707/999.006 |
| 2010/0131480 A1* | 5/2010 | Schneider | G06F 17/3015 707/698 |

OTHER PUBLICATIONS

International Search Report and Written Opinion in related application PCT/US2010/040058 dated Aug. 26, 2010.

Roh, H. et al., An Efficient Hash Index Structure for Solid State Disks, Proceedings of 2008 International Conf. on Information and Knowledge Engineering IKE 2008, Jul. 14-17, 2008, Las Vegas, NV, pp. 256-261.

Gal E., et al., Algorithms and Data Structures for Flash Memories, ACM Computing Surveys, vol. 37, No. 2, Jun. 1, 2005, pp. 138-163, XP-002453935.

Wu, C. et al., An Efficient B-Tree Layer for Flash-Memory Storage Systems, Real-Time and Embedded Computing Systems and Applications [Lecture Notes in Computer Science; LNCS], Springer-Verlag, Berlin/Heidelberg, Apr. 8, 2004, pp. 409-430, XP019005407.

Quinlan, S. et al., Venti: a new approach to archival storage, Proceedings of Fast, Conferene on File and Storage Technologies, Jan. 29, 2002, pp. 1-13, XP002385754.

International Preliminary Report on Patentability from corresponding application PCT/US2010/040058 mailed Nov. 3, 2011.

Best, S. & Kleikamp, D., JFS Layout: How the Journaled File System Handles the On-Disk Layout, May 2000, pp. 1-30.

AIX 5L Verson 5.2 System Management Concepts: Operating System and Devices, May 2004, 7th ed., IBM, pp. 1-190.

AIX 5L Version 5.2 General Programming Concepts: Writing and Debugging Programs, Aug. 2004, 9th ed., IBM, pp. 1-616.

Office Action mailed Feb. 26, 2014 from corresponding application JP2012-517787 (English translation).

Imaizumi, Takashi, Unix style programming:51, Unix Magazine, vol. 10, No. 1, pp. 166-173, Jan. 1, 1995, ASCII Co., Ltd., Japan (see English translation cited portions in English translation of JP Office Action of Feb. 26, 2014).

Summons to Attend Oral Proceedings pursuant to rule 115(1) EPC, dated Aug. 27, 2014 in EP 10730310.9.

Nov. 13, 2014 Response filed with European Patent Office in EP 10730310.9.

Dec. 17, 2014 Response filed with European Patent Office in EP 10730310.9.

Communication under Rule 71(e) EPC dated Feb. 25, 2015 in EP 10730310.9.

Feb. 9, 2012 Response to Int'l. Preliminary Report filed with European Patent Office in EP 10730310.9.

Communication pursuant to Article 94(3) EPC dated Jan. 21, 2013 in EP 10730310.9.

May 20, 2013 Response filed with European Patent Office in EP 10730310.9.

Result of Consultation dated Aug. 8, 2014 in EP 10730310.9.

* cited by examiner

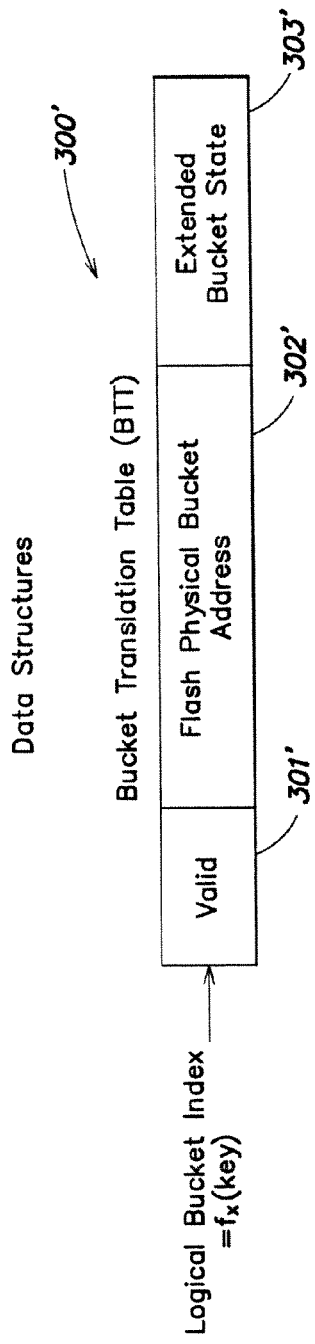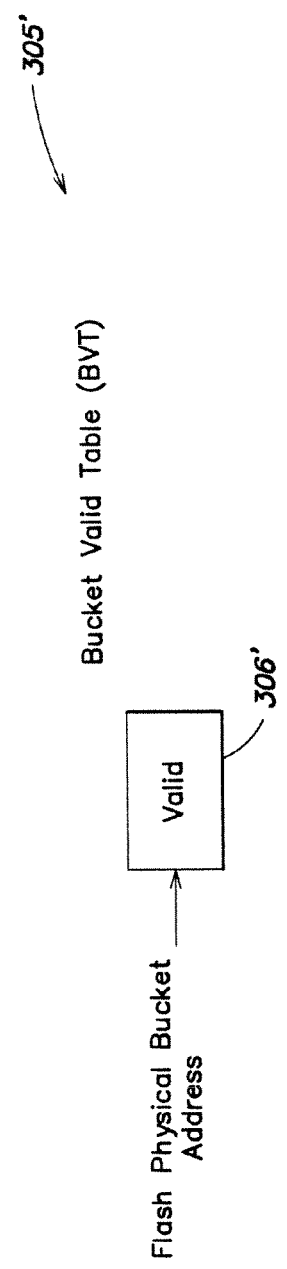
FIG. 10A
FIG. 10B

Displacement Hashing (Cuckoo Hashing)
|   | $H_0(X)$ | $H_1(X)$ |
|---|---|---|
| P | 2 | 5 |
| Q | 1 | 3 |
*FIG. 19A*
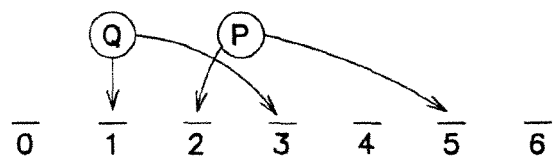
*FIG. 19B*
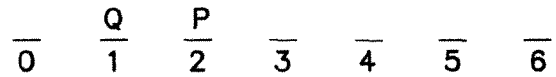
*FIG. 19C*
|   | $H_0(R)$ | $H_1(R)$ |
|---|---|---|
| R | 1 | 2 |
*FIG. 19D*
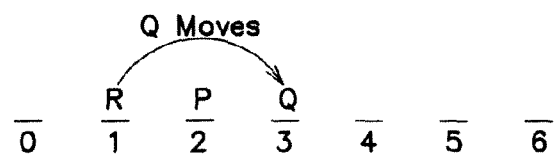
*FIG. 19E*

FILE SYSTEM ACCESSING AN OBJECT STORE

FIELD OF THE INVENTION

The present invention relates to computer file system data structures and to methods and apparatus for the naming and storing of files.

BACKGROUND

A fully featured storage solution may include raw disks, a file system, snapshots, file versioning, compression, encryption, built-in capacity optimization (e.g., data deduplication), other security features such as auditing and tamper resistance, efficient replication to an off-site location for disaster recovery purposes, and so forth. Many of these features are delivered in separate appliances that then have to be connected by highly experienced technicians.

Constructing such a storage solution with today's technology, for many terabytes (TBs) of data, often results in a multi-box solution that can easily exceed costs of $100,000, making such a fully featured storage solution not available to many businesses and customers.

This multi-box, ad-hoc solution is not a fundamental aspect of storage, but rather that file system architectures and implementations have not kept up with other technology developments. For example, most file system architectures have not evolved to fully leverage the faster computer processing units (CPUs), flash memory, and the different balance between network bandwidth, disk density and disk access rates.

If one defines data accessibility as the ratio of access bandwidth to addressable storage, the accessibility of data is decreasing. Storage densities are increasing faster than the access to the disks, so for a given data set size, the time needed to access the data is increasing (and thus causing reduced accessibility). The effect on storage architectures is as follows: once one stores the data, one should not move it unless absolutely necessary. This simple observation is violated many times in current storage architectures where data is constantly being read in and written out again. The result is significant extra expense (e.g., 10 channels, CPU, power, time, management).

SUMMARY OF THE INVENTION

In accordance with one embodiment of the invention, there is provided a file system comprising:
a digitally signed file system in which data, metadata and files are objects, each object having a globally unique and content-derived fingerprint and wherein object references are mapped by the fingerprints;
the file system having a root object comprising a mapping of all object fingerprints in the file system;
wherein a change to the file system results in a change in the root object, and tracking changes in the root object provides a history of file system activity.
In one embodiment:
the file system includes an inode map object comprising a mapping of inode numbers to file object fingerprints and wherein the fingerprint of the inode map object comprises a snapshot of the file system.
In accordance with another embodiment of the invention, there is provided a computer readable medium containing executable program instructions for a method of indexing stored objects, the method comprising:
providing data, metadata and files as objects;
providing a fingerprint for each object which is globally unique and derived from the content of the object; and
wherein a file system root object is provided comprising a mapping of all object fingerprints in the file system, such that a change to the file system results in a change in the root object, and tracking changes in the root object provides a history of file system activity.
In one embodiment, the method includes:
providing a file system inode map object comprising a mapping of inode numbers to file object fingerprints, wherein the fingerprint of the inode map object comprises a snapshot of the file system.
In one embodiment, the method includes:
publishing the inode map fingerprint to another computer system on a distinct object store.
In one embodiment, the method includes:
using the inode map fingerprint as a snapshot of the file system for disaster recovery.
In one embodiment:
the inode map object contains a fingerprint of a previous inode map.
In one embodiment:
the previous inode map fingerprints comprise a history of snapshots of the file system.
In one embodiment:
the objects have reference counts; and
upon a change to the file system, adjusting the object reference counts of every object beneath the inode map object.
In one embodiment:
the adjusting is performed on every IO transaction to provide continuous data protection.
In one embodiment:
the adjusting is performed periodically, on demand, or on particular events to generate snapshots.
In one embodiment:
the objects have reference counts; and
adjustments to the reference counts are utilized for data deduplication such that only new data content is stored.
In accordance with another embodiment of the invention, there is provided a computer file system for naming and storing of files on one or more computer storage devices, the system comprising:
a namespace file system wherein files, data and metadata are objects, each object having a globally unique fingerprint derived from the content of the object, each file object comprising a mapping of object fingerprints for the data objects and/or metadata objects of the file and the file object having its own object fingerprint derived from the fingerprints of the objects in the file, and wherein the system includes a mapping of inode numbers to the file object fingerprints.
In one embodiment:
object references are defined by the object fingerprints.
In one embodiment:
the file object mapping comprises a linear list, a tree structure or an indirection table.
In one embodiment:
the file objects include a root object having its own object fingerprint derived from all of the objects in the file system such that every object in the file system is accessible through the root object.
In one embodiment:
the namespace file system is provided as a layer in a storage stack between a virtual file system layer and a block storage abstraction layer.

In one embodiment, the system further comprises:
an object store containing an index of object fingerprints, object locations and object reference counts.

In one embodiment:
the object store index is stored in non-volatile memory.

In one embodiment:
the fingerprint is an cryptographic hash digest of the object content.

In one embodiment:
the object size is variable.

In one embodiment:
the file system is a POSIX compliant file system.

In accordance with another embodiment of the invention, there is provided a method comprising:
generating object fingerprints for data objects in a file system, the data objects comprising data or metadata, and the object fingerprints comprising a globally unique fingerprint derived from the data object content;
generating object fingerprints for file objects, wherein each file object comprises the fingerprints of a plurality of the data objects in the file and the file object fingerprint comprises a globally unique fingerprint derived from the file object content; and
generating a root object comprising a mapping of all the object fingerprints in the file system.

In one embodiment, the method comprises:
maintaining a reference count for each object, and updating the object's reference count when references to the object are added or deleted.

In one embodiment, the method comprises:
generating a transaction log of object activity, including reads, writes, deletes and reference count updates.

In one embodiment, the method comprises:
adding, modifying or deleting a data object in a file and generating a new file object fingerprint.

In one embodiment:
when the content of a file object or data object is changed, propagating the change up to the root object.

In one embodiment, the method comprises:
performing the propagating step at one of:
every I/O transaction;
periodically;
on demand;
at a particular event.

In accordance with another embodiment of the invention, there is provided a method comprising:
providing a plurality of data objects, each data object comprising data or metadata, and each data object having a fingerprint which is globally unique and derived from its content; and
generating a file object comprising a plurality of data object fingerprints for a plurality of associated data objects, and generating a file object fingerprint which is globally unique and derived from the content of the file object; and
maintaining an index of inode numbers to file object fingerprints.

In one embodiment, the method comprises:
maintaining a location index for mapping object fingerprints and physical locations of the objects.

In one embodiment:
the location index includes reference counts for the objects.

In one embodiment:
the fingerprints and indices comprise a file system.

In accordance with one embodiment, there is provided:
a computer program product comprising program code means which, when executed by a process, performs the steps of method claim 27.

In accordance with another embodiment of the invention, there is provided:
a computer-readable medium containing executable program instructions for a method of indexing stored objects, the method comprising:
generating fingerprints which are globally unique and derived from the content of data and metadata objects;
generating file objects comprising a plurality of fingerprints of data and/or metadata objects and generating fingerprints of the file objects which are globally unique and derived for the content of the file object; and
generating a root object comprising a mapping of all the fingerprints of the data, metadata and file objects.

In accordance with another embodiment of the invention, there is provided:
physical processor and storage devices providing access to data, metadata and files; and
wherein the data, metadata and files are objects, each object having a globally unique and content-derived fingerprint and wherein object references are indexed by the fingerprints; and
the indexing includes mapping of inode numbers to the file object fingerprints.

In accordance with another embodiment of the invention, there is provided:
a processing and storage apparatus for naming and storing data objects and collections of data objects comprising file objects, each data object comprising data or metadata and each object having a content-based globally unique fingerprint as its object name, the file object being a collection of data object names and having its own content-based globally unique fingerprint as its file object name;
a file system having two layers including:
an object store layer including a mapping index of object names and physical object locations; and
a namespace layer including a mapping index of data object names for each file object.

In one embodiment:
the namespace layer includes a mapping index of inode numbers to the file object names.

In one embodiment:
the object store layer includes reference counts for each object.

In one embodiment:
the object name is a cryptographic hash digest of the object content.

In one embodiment:
the system includes hardware acceleration apparatus to perform for one or more of object naming, compression and encryption.

In one embodiment:
the object store layer includes a global index of all objects in the file system, wherein the primary key for the global object index is the object name, and the object name is a cryptographic hash digest of the object content.

BRIEF DESCRIPTION OF THE DRAWINGS

The invention will be more fully understood by reference to the detailed description, in conjunction with the following figures, wherein:

FIGS. 10A through 10D illustrate various embodiments of data structures which may be used in the invention;

FIGS. 19A-19E illustrate schematically an implementation of cuckoo hashing according to one embodiment of the invention;

DETAILED DESCRIPTION

Figure 1:
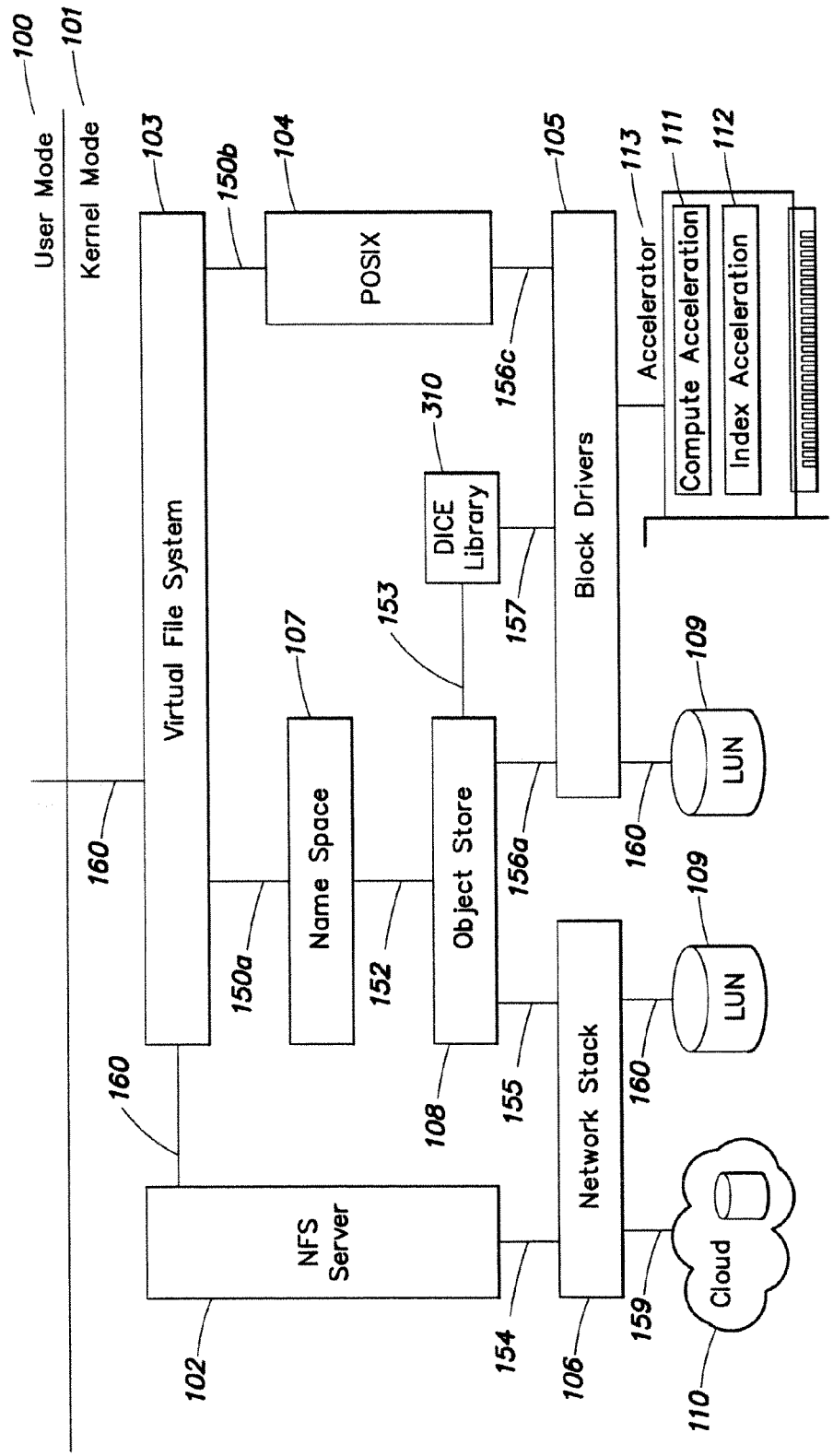
FIG. 1 is a schematic block diagram illustrating one embodiment of the invention integrated into an operating system kernel space.

A. Traditional File System Data Structures and Limitations of Prior Art (Legacy) File Systems A traditional file system has several basic data structures. In addition to user visible directories and files, internal structures include superblocks, inodes, allocation maps, and transaction logs.

Allocation maps are data structures that denote which blocks on a disk are in use or not. These data structures can be as simple as a bitmap, or as complicated as a btree. Allocation maps can be large, and almost never fit in memory. Naïve allocation of new blocks results in low disk performance, but optimal placement requires sophisticated allocation algorithms given the aforementioned memory limitations.

Directories are lists of names of files and other directories, and in many file systems, are treated as another file type that is just interpreted differently. Internally a directory is a list of filename/inode number pairs. When the file system wants access to a filename, it must find the filename in a directory, and the corresponding inode number.

Files are named collections of data. A file name, along with the inode it references, is stored in a directory structure. Many file systems support the concept of links, where different file names can point to the same data (inode).

Transaction logs are used to keep the file system consistent in accordance with Atomic, Consistent, Independent and Durable (ACID) properties. Many file systems will guarantee metadata consistency, but have different service level agreements (SLAB) for data.

A superblock is a small data structure that resides at a known location on a disk or persistent medium. From the superblock, all other data structures relevant to the file system can be found, such as the size and location of the inode table, allocation maps, the root directory, and so forth. When a file system is mounted, it is the superblock that is first accessed. For safety reasons, superblocks are often replicated at various points on a disk.

Perhaps the most fundamental data structure is the inode ("index node"). Common to many file systems, it is a data structure that is the basic container for content, such as a file. The inode itself does not contain a filename; that is stored in the directory. An inode is identified by an integer that denotes an index into a disk resident data structure (the inode table). Each inode entry in the table describes where on the disk the content can be found for this file. This "map" can take various forms, including linear lists, indirection tables, various tree types, each of which have various speed/space tradeoffs. Important is that the map uses physical or logical addressing, such as a logical block number (LBN). An LBN only makes sense if you know which disk it is intended for.

From the above description, it should be clear that legacy file systems have tight control of the what (content) and the where (placement of data). This co-mingling of what and where, largely an artifact of history, results in an architecture that is difficult to extend to modern storage needs.

B. Novel Data Structures and Features of the File Systems of the Invention

In accordance with various embodiments of the invention, new data structures are provided for implanting a new type of file system. The file system can exist and work alongside other file systems; it is compatible with legacy file systems and known user level utilities. However, the new data structures of the present invention provide benefits unachievable with legacy file systems. These benefits include, but are not limited to, one or more of the following:

- providing a level of abstraction for the naming and storage of files that does not rely upon physical or logical block addressing;
- utilizing a globally unique fingerprint derived from the content of a data object as the object name, each data object comprising data or metadata;
- utilizing object fingerprints in a namespace file system wherein all internal data structures are objects, enabling all inter-object references to be defined by the object fingerprints;
- providing a new data structure referred to as an "hnode" structure; a file hnode is a mapping structure of all data object fingerprints in the file and itself is an object having a globally unique fingerprint derived from the content of the file object;
- similarly a root hnode (object) is a mapping structure of all object fingerprints in the file system, such that any change to the file system results in a change in the root object and tracking changes to the root object provides a history of file system activity;
- providing an inode map object (an imap) comprising a mapping of inode numbers to file object fingerprints, enabling the inode number to stay constant, while the object name (fingerprint) changes as the file content changes, and wherein the fingerprint of the inode map object comprises a snapshot of the file system.

In the disclosed embodiments, the object name, i.e., object fingerprint, is cryptographic hash digest of the object's content. This enables the object name to be globally unique and identifiable as a fingerprint of the object content. A fingerprint is significantly smaller than an object, e.g., a factor of 100×, 1000× or more, and thus manipulating fingerprints is often faster and easier than manipulating the underlying contents.

By providing combinations or collections of data objects as hnodes, which are also objects having an object name which is the object fingerprint, the hnode is globally unique and derived from the content of the data objects included in the hnode. Any change (e.g., add, delete, metadata change, read) results in the file system hnode fingerprint being changed. By tracking the changes to the imap there is provided a complete history of all file system activity.

Unique to the invention is an inode map object (aka imap), which converts an inode number into an object fingerprint. This enables the namespace file system to deal with inode numbers, which is a central, as many user level activities reference the inode number. The hnode mapping of fingerprints (object names) to inode numbers provides an additional layer of indirection (or virtualization) over a traditional static inode table. By using this indirection table, an inode number can stay constant, but the associated object name (fingerprint) can change as the file corresponding to the inode changes. Since the imap itself is an object, that name too will change as the file system is modified. The fingerprint of the imap is essentially a complete "snap shot" of the file system. Once you have the snapshot fingerprint, one can continue working on the file system (writable snaps), and remember it for future use (e.g., for disaster recovery). One can also publish the snapshot fingerprint to another system, sitting on a distinct object store. While the other object store may not fully host all of the snapshot data (objects), the mechanism described is still fully consistent and usable.

These and other benefits of the present invention will be more particularly described below with reference to various embodiments of the invention.

Prior to describing specific examples of the new file system, implemented in both kernel space and then user space, a more general description of the various components utilized in the present embodiment will be defined.

Object Store

An object store, in the present embodiment, is a flat collection of opaque data (objects). Each object is unique, and has reference counts (the number of times it is referenced by the namespace file system). An object's name is a cryptographic hash of the object's content, i.e., change the content and the name must change.

Any sufficiently strong cryptographic hash is acceptable for generating object names (fingerprints). By way of example, Secure Hash Algorithm (SHA) hash functions are a set of cryptographic hash functions designed by the National Security Agency (NSA) and published by the NIST as a U.S. Federal Information Processing Standard. SHA-I is the best established of the existing SHA hash functions, and is employed in several widely used security applications and protocols.

In practice, object sizes are typically powers of 2, and range from 512 bytes ($2^9$) up to 1 MB ($2^{20}$) or more, although there is no architectural restriction on the size of an object.

A typical object size is 2 KB ($2^{11}$ bytes). For an 8 TB ($2^{43}$ bytes) file system, that is $2^{32}$ objects, or roughly 2 billion objects. Each object's entry in the index is about 32 ($2^5$) bytes, so the object index, assuming it is densely packed, is $2^{37}$, or 128 GB, or about 2% of the total file system space. Other object sizes can be used with no loss in applicability or generality.

Objects are compressed and encrypted transparently to the user of the object. Object names are based on clean, uncompressed data (and optional salt). What is actually stored in the object is one of (clean), (clean compressed), (clean, compressed encrypted) or (clean encrypted) data.

Objects are typically read/written with clean data only, and the compression/encryption happens internal to the object store.

Using strong cryptographic digests enables objects to have globally unique and consistent names. Two objects with the same name will, for all practical purposes, have the same content.

NameSpace

The namespace file system, in the present embodiment, has files, a directory structure, links, a superblock, and so forth.

The namespace file system doesn't contain data directly, instead all data is stored in objects. Objects are relatively small, and frequently larger data structures are needed. The structure that aggregates objects is called an hnode.

As a practical manner, a file system that plugs into a Unix or Linux environment needs to expose inode numbers. (nodes are numbers that uniquely identify a file.

Hnode

An hnode, in the present embodiment, is a data structure that ties together content, such as a file. Sometimes content can be very large (many GB), and does not fit contiguously on a disk or persistent medium. The content is broken up, and stored as discrete units. In the case of traditional file systems, this would be blocks on disk. In the invention, these are object names. The hnode keeps a list of all the object names in a mapping structure. Linear lists are one example of such a mapping structure, but more complicated indirection tables are also possible.

There are two main differences between an hnode and inode. First is that an hnode uses object names (fingerprints) which identify the object's content, whereas an inode uses physical or logical block addressing. Second, is that an hnode has a well defined, globally unique, name (the hash of it's content). In a preferred embodiment, described below, the hnode name is a hash of the object content and salt.

Inode Map Object (Imap)

Unique to the invention is an imap, which converts an inode number into an object fingerprint (name). This fingerprint is typically an hnode, which is in turn interpreted in various ways depending on context. This enables the rest of the namespace file system to deal with inode numbers, which is essential, as many user level utilities need to see such a construct. In some sense, this provides an additional layer of indirection (or virtualization) over a traditional static inode table.

By using this indirection table, an inode number can stay constant, but the associated object name (fingerprint) can change as the file corresponding to the inode changes. Since the imap itself is an object, that name too will change as the file system is modified.

In a traditional file system, the root directory is at a known inode number, and in the case of the imap, that is also the case.

If you have a fingerprint of the imap, you essentially have a complete "snap" of the file system. Bumping the reference count of every visible object underneath this fingerprint locks the snap, and prevents it from being deleted regardless of other file system activity.

Once you have a snap fingerprint, you can continue working on the file system (writeable snaps), remember it for future use (perhaps for disaster recovery purposes). You can also publish the snap fingerprint to another system, sitting on a distinct object store. If an object store can't resolve a read request of a particular fingerprint, to the extent that it is aware of other object stores, it may forward the request to those stores. Thus, the snap's fingerprint may move to a system whose object store may not fully host all of the snap's data (objects), but via the mechanism just described is still fully consistent and usable.

Superblock

A superblock, in the present embodiment, is a data structure that is used when an object store lives on persistent media. It lives in a known location(s). It describes where the allocation maps, imap, object pool, index and other structures live on the medium. An object store always has globally unique identifier (GUID), which represents that unique instance of an object store.

In the case where the object store participates in a large object pool, the superblock also contains the GUID of the larger pool, and the GUIDs of all the members, and the relationship of the members (stripped, replicated, erasure coded, etc).

File

A file construct, in the present embodiment, is derived from an hnode. It has all of the normal (e.g., POSIX®) semantics regarding files, such as read, write, open, close, and so forth.

Directory

A directory, in the present embodiment, is a specialized version of an hnode. It contains a map of (inode number, object name) pairs. A linear list, vector or other more complicated structures are example implementations. The map at a minimum must be serializable and de-serializable in order to persist as it to an hnode. Depending on the mapping structure, random access is also possible.

Tracking

As a file system is modified due to normal writes, deletes and reads (observe that a read changes access times), the objects and hnodes constituting that file system also change. This results in a history of root hashes, which at a very fine granularity is called continuous data protection (CDP), and at a coarser granularity, snaps. The difference is only in how often the root hashes are captured.

Every object in the system must be accessible through at least one root hash.

In the present embodiment, as an hnode H is written, a new hnode H' is created, and if more changes occur, possibly H". These changes may accumulate, but at some point the last change propagates back up to the root. This pending input/output (IO) enables the file system to accumulate changes and not propagate up to the root on every change. How often this happens is policy based. Reference counts for objects in the middle of the change list H→H'→H" must be dealt with accordingly so that there are not dangling references, or unreachable objects.

C. Examples (Implementations) of the Invention

Referring now to FIG. 1, shown are various storage components in an operating system kernel 101. Although drawn from a Linux environment, the diagram is generic enough that it applies to other operating systems such as Windows®, Solarise and other Unix class operating systems.

An example of a POSIX® 104 style file system is shown, where POSIX® can be any one of any number of file systems such as ResierFs, Exts, btrfs and zfs with no loss in generality. A virtual file system (VFS) layer 103 is used to abstract out many common features of file systems, and provides a consistent interface 160 to user space 100 and other components. The VFS 103 also has a well defined "lower edge" interface 150 that any file system must use (if it expects to be recognized by the VFS 103 layer). In practice, there are typically many file systems working in parallel.

File systems normally sit on top of a block storage abstraction, implemented by block drivers 105. The block storage may be on a Logical Unit Number LUN local storage device 109, or it may be on a remote LUN using an iSCSI protocol. Block Drivers 105 also have well-defined interfaces in an operating system.

In this embodiment, the new file system works alongside the other file systems in the kernel. The new file system is composed of a namespace file system 107 that is stacked on top of a lightweight object file system 108. The interface 152 between the two components may be any of various industry standard object interfaces such as the ANSI T-10 object standard.

The Object file system (Object Store) 108 in turn is partitioned such that a library of commonly used functions, the Digest, Indexing, Compression, Encryption (DICE) library 310 is abstracted out. The library 310 may be realized completely in software, or take advantage of a variety of hardware acceleration 113 techniques, one of which is illustrated.

The object file system 108 creates an object container that may sit on top of a raw LUN, a partition on a disk, or a large file. It may also reference containers via a network stack 106 using protocols such as iSCSI or other remote access block protocols (FCoE being another example). A Network File System (NFS) 102 sits on top of the network stack 106 (via interface 154) and the NFS is connected to the VFS 103. The network stack 106 is connected to LUN 109 via interface 160, and to Cloud 110 via interface 159.

Figure 2:
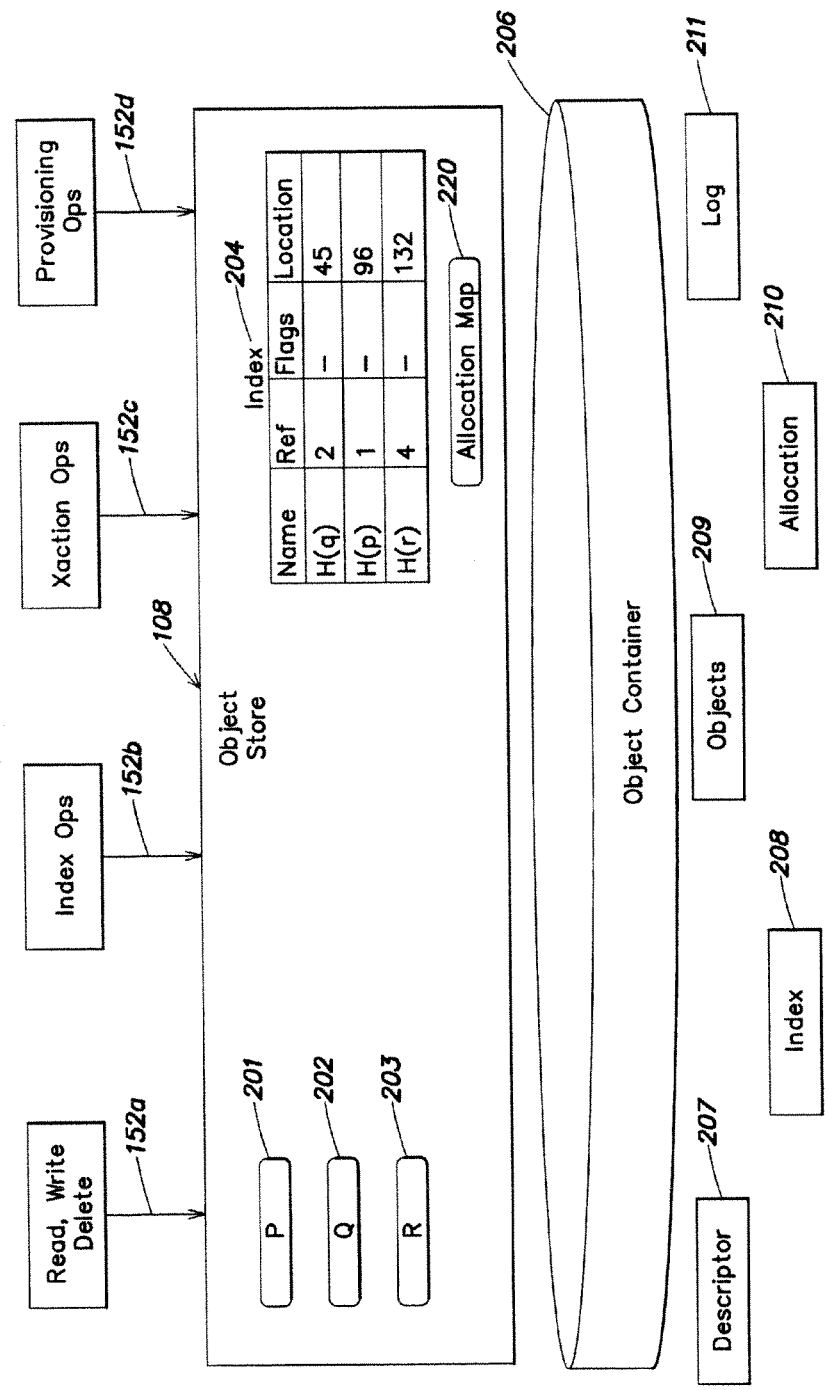
FIG. 2 is a schematic block diagram of the major components of one embodiment of an object store, enabling the object store to be hosted on a variety of physical media.

Referring to FIG. 2, Object Store 108 is further decomposed. Object store 108 contains binary, opaque objects, examples of which are P 201, Q 202 and R 203. Objects may be of varying size, although in a preferred implementation they are powers of 2. An object resides at some offset in the container, which may be a byte offset, or an offset modulo the smallest object size (i.e., if the smallest object is 512 bytes, then the offset would be multiplied by 512 to get the byte offset).

Each object has a name (fingerprint), which is a cryptographic digest (hash) of the object's entire content, plus some site specific salt. In FIG. 2, the object names are denoted by H(P), H(q) and H(r).

An index structure 204 keeps track of object names, object locations, and object references. An object's reference is incremented every time the object is written. The namespace file system 107 may generate what it thinks are many copies of the same object; the object store 108 only stores one, but keeps track of how many the namespace actually thinks it has.

The object store 108 has several interface classes. The read, write, delete interface 152a does exactly that for objects. An object deletion in this context is really a decrement of the object's reference count. Storage for the object inside the object store will be released only when the reference count goes to 0.

The indexing operations 152b enable enumeration of objects by name, reference count adjustments, and looking up of objects by name.

The object store 108 has transactional semantics (ACID properties), and transaction boundaries are managed through the transactional operations 152c. This includes start, commit and abort of a transaction, in addition to listing of pending transactions.

A provisioning interface 152d enables object stores to be created, deleted, merged, split and aggregated.

The index 204 is a map, who's primary key is the object name. As discussed elsewhere, the index can be very large. There is an index entry for every object in the system. Each entry contains:
  a) a fingerprint of the object's content. Fingerprints are generated by a cryptographic digest over the content, with a small amount of additional content ("salt") appended. The salt is common to all objects in the object store.
  b) a reference count indicating how many times the object is referenced. The reference count may use saturating arithmetic to save space. For example, it may only use 8 bits to track references: the reference count can be added and decremented, but if it equals or exceeds 255, the count "saturates", and no further decrements are allowed.
  c) a physical locator. If the object is on a physical disk, this may be a logical block number LBN. If the object is hosted by a hosting provider (e.g., Amazon S3), then it would be a reference to the cloud object.
  d) flags for various uses. One flag indicates if the object is stored compressed or not, another if encrypted or not. Other flags are available, but are not allocated to a specific use.

The allocation map 220 is normal bitmap used for allocated blocks on the object container 206.

The object container 206 is a randomly addressable persistent storage abstraction. Examples include a raw LUN, a file, a partition on a disk, or an iSCSI device across the Wide Area Network WAN.

The object container 206 has several components 207-211 (not shown to scale). Aside from the container descriptor block 207, which lives at a known offset, the order of the other components is not material.

The index 208 may have container resident portions, or portions in memory 204, or both, such as a Btree. The allocation map 210 also may be partially on disk and in memory 220. Migration between the two can be accomplished with paging techniques.

As the object store is modified, a transaction log 211 is kept on persistent storage. The log tracks all object activity, including reads, writes, deletes, reference adjustments, and so forth. The log is kept in time order, and is periodically rolled into main index 208. Object activity must "hit" on the log first before searching the main index. Each log entry consists of an operation type 152a, 152b, 152c, 152d, the fingerprint, reference count, transaction ID or epoch number, and pool location. A log entry is structurally similar to an index entry, with the addition of the transaction ID.

Global object naming enables an object store to move objects around while still preserving consistent naming and access. Reasons for moving an object include:
  a) Moving related objects close to each other on a physical disk, for performance reasons.
  b) Replicating objects across fault boundaries. This can be across two separate local disks, a local disk and a remote disk, or any multiple thereof. Replication can also confer read performance benefits. Replication can also include splitting objects, such as with erasure codes.
  c) Background operations on objects such as compression, decompression, encryption, decryption, and so forth.
  d) Moving objects based on temperature, i.e., their frequency or expected frequency of use.

Figure 3:
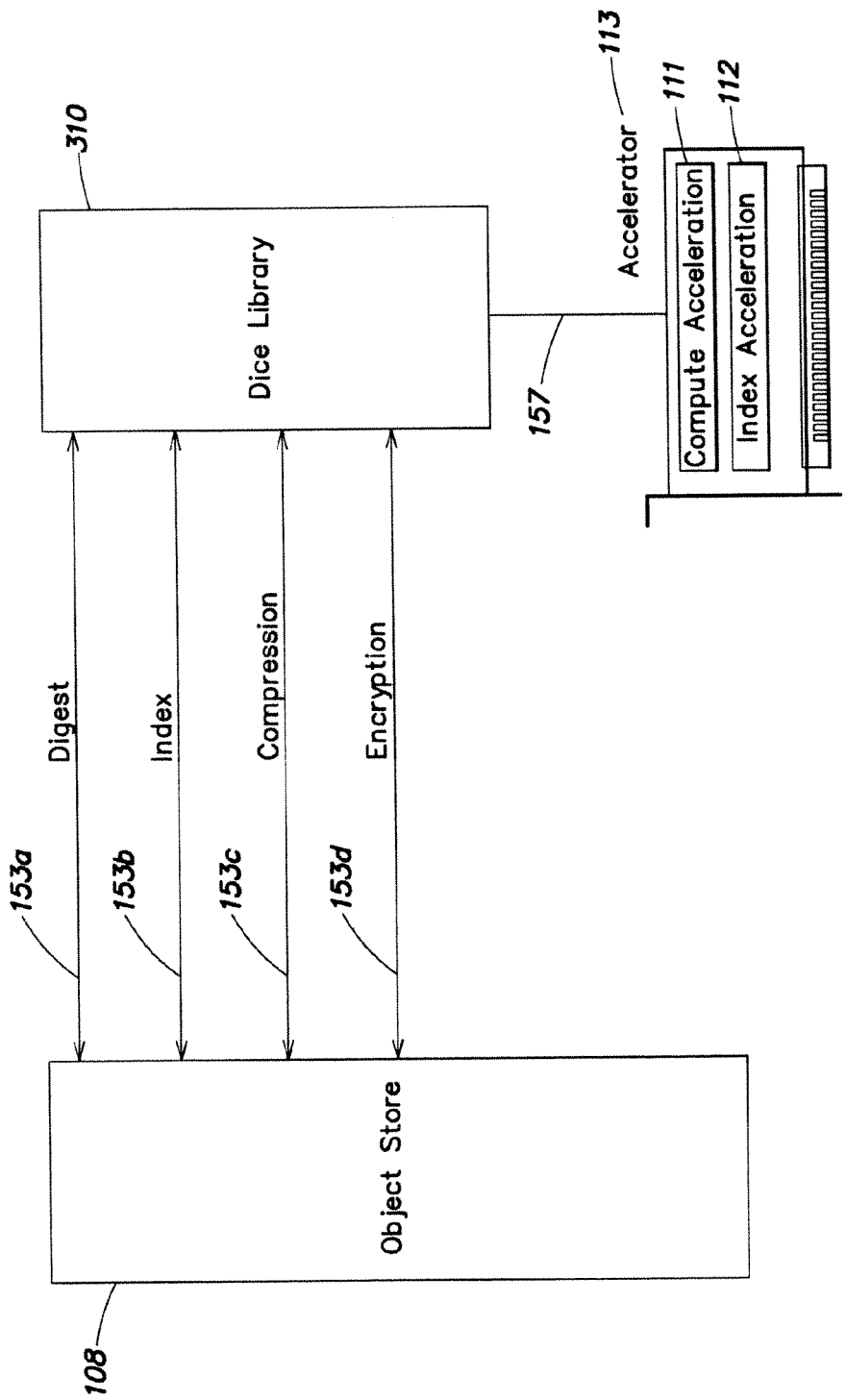
FIG. 3 is a schematic block diagram of one embodiment of an object store that can abstract out key functionality, enabling said functionality to be implemented in a variety of ways without impacting the object store design; implementations may range from a pure software solution, to one using hardware acceleration.

FIG. 3 illustrates the relationship of the object store 108 with the DICE library 310. The library 310 abstracts out common features of the object store, such as digests 153a, indexing 153b, compression 153c and encryption 153d.

While providing a consistent interface, internally the library may use a variety of techniques to deliver the services. Implementation techniques include software only, partial hardware assist (Intel QuickAssist®, for example), or a custom hardware implementation that can store large amounts of index, or any combination of the above.

If using a hardware accelerator 113, that accelerator may have two broad classes of service: one for compute intensive operations 111 (compression, encryption, fingerprinting), and another for memory intensive operations 112 such as an index. A hardware implementation may have one or the other, or both.

Figure 4:
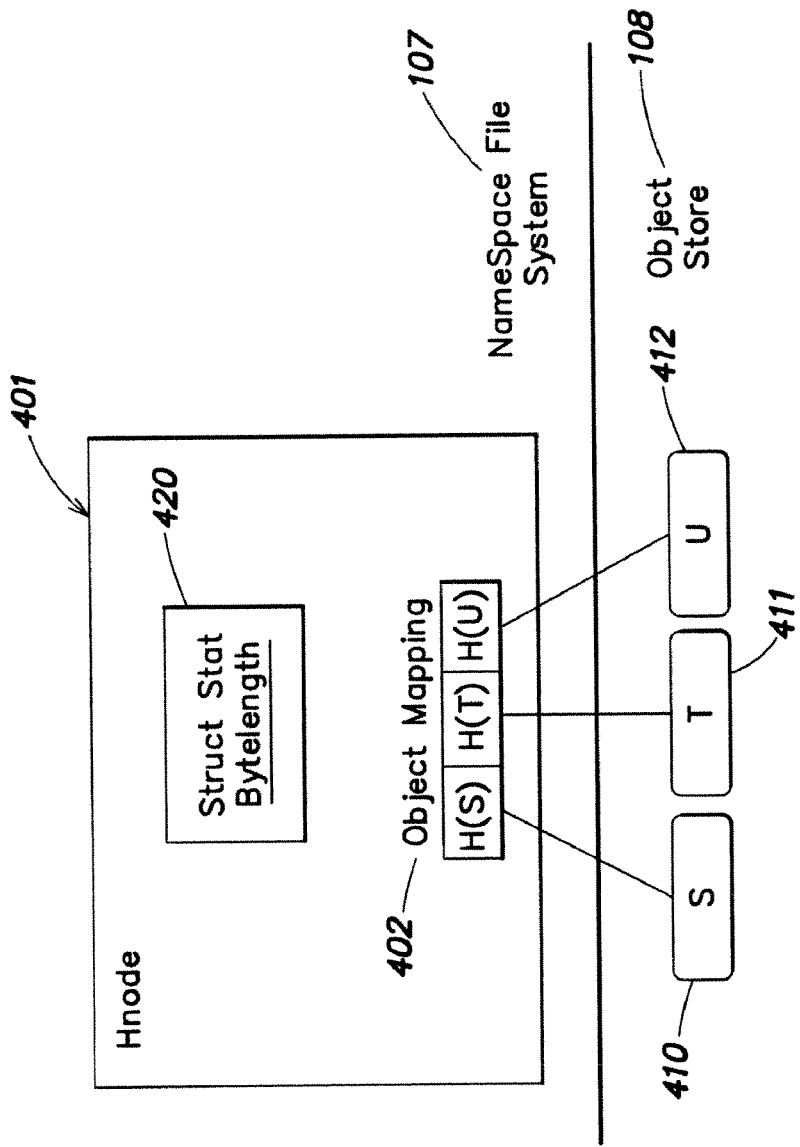
FIG. 4 is a schematic block diagram of one embodiment of a set of objects grouped together into a construct ("hnode") as a basic building block of an integrated file system.

FIG. 4 illustrates key components of an hnode structure 401 in the present embodiment. The hnode uses object identifiers (fingerprints) to identify content, rather than physical/logical block addressing that legacy inodes use.

An hnode is a sequence of content, like a file, that can be randomly read, written, appended to, created, deleted and truncated. Content can be accessed on arbitrary byte boundaries, and with arbitrary ranges. How the content is interpreted depends on context.

An hnode 401 may have a stat structure 420, e.g., a POSIX® structure used for file metadata. Part of that structure may include the byte length of the file, or hnode in this case. The data sequence is broken into discrete objects, for example, S 410, T 411 and U 412 in FIG. 4. The names of each object are stored in a mapping table 402, which records the fingerprints of each of S, T and U. Objects do not necessarily have to be the same length.

The mapping table 402 may have various representations, including a linear list, a tree structure, or an indirection structure, with no loss in generality. A mapping table 402 is indexed by an offset into the content (the sequence S, T, and U) to determine which object(s) are to be referenced, in a manner similar to the way standard Unix inode indirection tables work.

An hnode itself is an object, and thus has a unique name. As any one or more of the stat structure 420, the mapping table 402, and any of the referenced objects change, then the hnode's name (fingerprint) will also change.

An hnode may be randomly accessed for both read, write and append. Hnodes support sparse space, where data that has not been written returns a known value (typically 0).

Any change to an hnode results in a new hnode, as the hnode's name is a function of its content. The original hnode may be de-referenced, or kept (by increasing the reference count), depending on file system policy.

An hnode 401 may have additional structures, e.g., in addition to a standard Unix "stat" structure 420.

Figure 5:
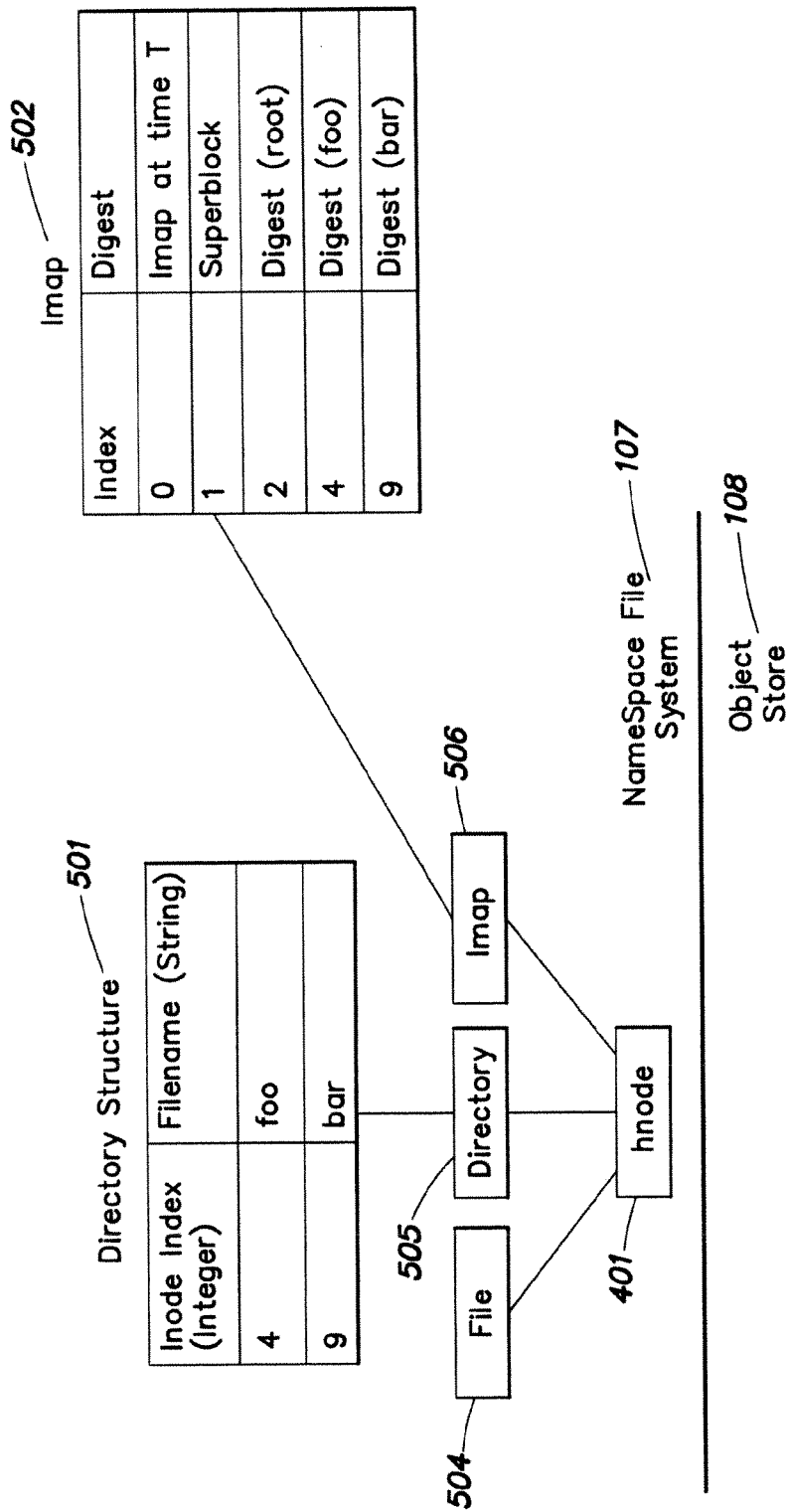
FIG. 5 is a schematic block diagram of one embodiment of an hnode that can be specialized into other data structures as needed by the file system, such as files, directories and imaps.

As shown in FIG. 5, an hnode 401 is a randomly addressable sequence of content, similar to a file. How that content is interpreted depends on context. In the present embodiment of the invention, an hnode is further specialized into files, directories and imaps. In the parlance of object oriented programming, the classes file, directory and imap are derived from the base class hnode.

A file 504 may be a thin wrapper that makes an hnode appear as a normal POSIX® file that can be opened, closed, read, written, and so forth.

A directory 505 is another interpretation of an hnode 401. A directory 505 is a mapping 501 of inode numbers (an integer) to file names (a string). The mapping can take various forms, including but not limited to, a linear list, B-trees, and hash maps. If the map 501 is entirely in memory, it is a requirement that the map can be serialized and de-serialized.

An imap ("inode map") 502 translates inode numbers (from directory 501) into an object digest (fingerprint). The object may represent an hnode (and therefore by extension, a file, directory or other imap), a structure such as a superblock, or other data.

An imap may have reserved locations, such as index 0, index 1, and so forth, for well known objects. Examples include previous imap(s), file system superblocks, and so forth.

Figure 6:
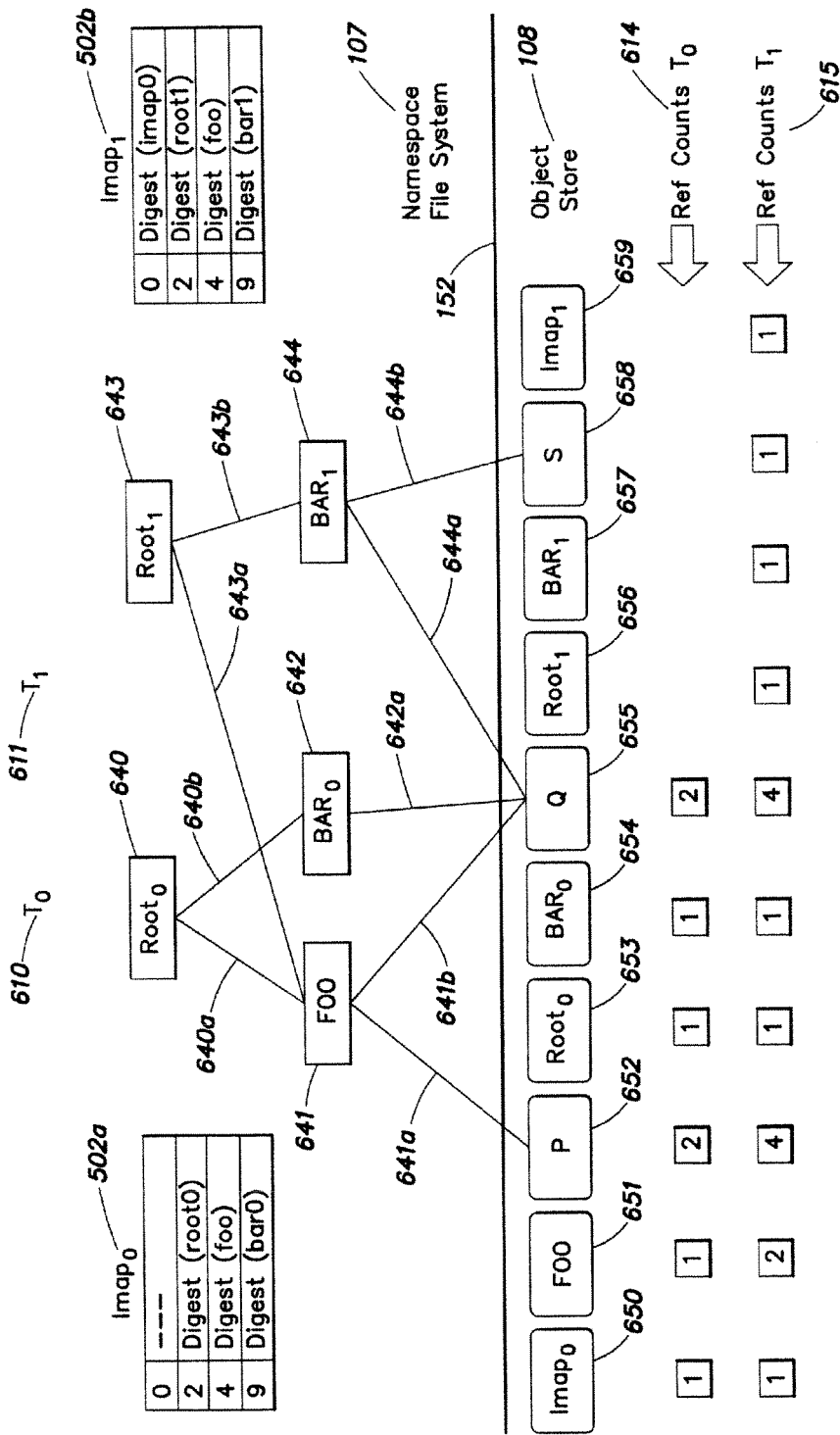
FIG. 6 is a schematic block diagram of one embodiment illustrating how changes to the file system are tracked and maintained over time, and how the techniques used naturally result in space efficiency, immutability and security.

FIG. 6 illustrates how file content and metadata change from an initial time $T_0$ 610 to time $T_1$ 611 as content is added. Deletion of content follows a similar path.

The diagram shows both object store 108 components, and namespace 107 components, separated by the interface 152.

At time $T_o$ 610, $Root_o$ directory $Root_o$ 640 has two files FOO 641 and BAR 642. The file FOO 641 in turn is comprised of content broken up into objects P 652 and Q 655. Object names for P 652 and Q 655 are stored in FOO's 641 mapping table, illustrated previously (FIG. 4). Similarly, file BAR 642 has content Q 655. The root directory 640 is also an object, denoted by $Root_o$ 653. Similarly, the files (hnodes) FOO 641 and BAR 642 are represented in objects 651 and 654 respectively. The initial $Imap_0$ 502a is also represented in an object $Imap_0$ 650, as is the root directory $Root_0$ 640 which has an object $Root_0$ 653.

As the object Q 655 is common to both files FOO 641 and BAR 642, it has a reference count of 2, whereas object P 652 only has a reference count of 1 at time $T_0$ 610.

The root directory 640 contains two entries, one for each of FOO and BAR. FOO's entry has a inode index of 4, and BAR's inode index is 9.

The $imap_0$ 502a is an hnode, and is stored as such as an object 650. To avoid complicating the drawing, although the imap is an hnode, and an hnode may map onto many objects, it is shown here as one object.

By convention, the digest of the root directory is always stored at imap index 2. The digest of an imap enables full access to a file system. By reading the object associated with the imap, the root directory is obtained, and from there any subsequent directory and/or files. Furthermore, the digest of an imap precisely and unambiguously defines the content of the entire downstream file system.

Immutability: If for example, object Q changes, then the name changes (an object's name is a function of it's content). Any mapping tables that point to the modified Q now don't, and therefore the modified Q is not "visible". Similar arguments apply to any object that is referenceable by the digest of an imap.

At time $T_1$ 611, file BAR 642 has content S 658 appended to it, so that a new file BAR 644 is created. A new file BAR must be created so that digests and object names are consistent. As new content S 658 is added, everything that references it is also updated and a new version created. This applies to a newer version of BAR 644, the root directory 643, and most importantly, a new imap table 502b. Object reference counts 614 at time $T_O$ 610 are adjusted as content is added/removed, so that at time $T_1$, $T_1$ object reference counts 615 represent content that is unique to $T_O$, unique to $T_1$ and content that is in common.

At time $T_1$ 611, there are essentially two file systems that have a lot of common content. The two file systems are fully specified by the digests of their respective imaps, $imap_0$ 502a and $imap_1$ 502b. For example, at time $T_O$ 610 object Q 655 can be referenced through paths (640a, 641b), (640b, 642a), (643a, 641b) and (643b, 644a).

As a file's content is modified (added, deleted, modified), the file's mapping table is also changed. In turn the object containing the file mapping, the hnode, also changes. For various reasons (performance, management interfaces), it may not be appropriate to propagate every change all the way up the tree to the root directory and into the imap. However, if done on every IO transaction, the system implicitly implements a CDP, where every digest of the imap represents a particular IO transaction. If done periodically (e.g., every hour or so), on demand, or on particular events (file close), then the behavior is similar to file system snapshots.

As objects have reference counts, to the extent there are identical objects, deduplication is native to the system. As a file system changes as a result of modifications, for the most part, only the changes will result in new content being added to the storage pool.

Figure 7:
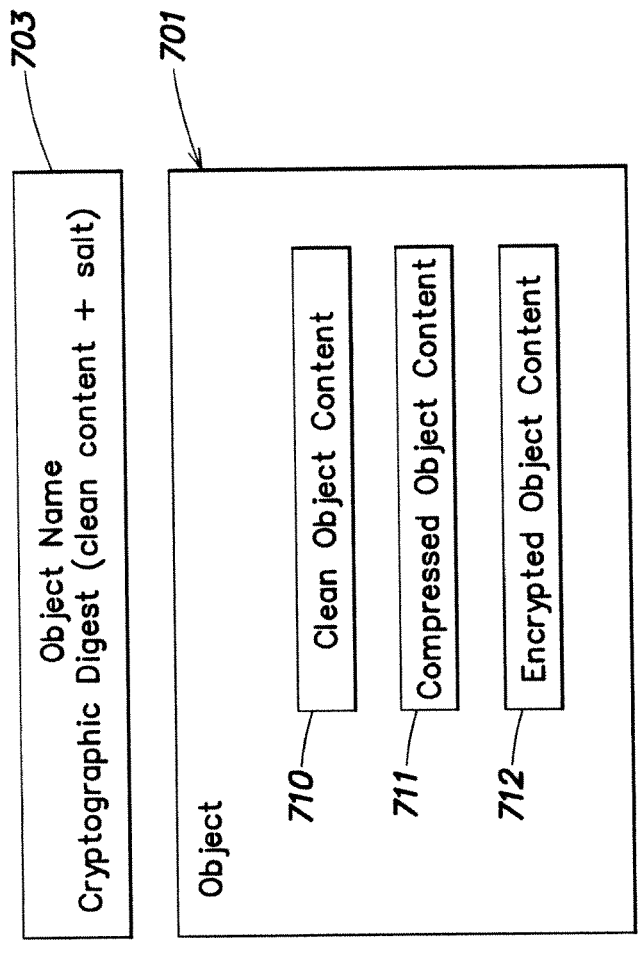
FIG. 7 is a schematic block diagram of one embodiment of an object that can transparently handle compression, encryption and location independence while providing a globally unique name for the object.

In FIG. 7, object 701 is a sequence of opaque, binary data and has an object name 703. Object sizes are arbitrary, although in a preferred implementation they may be a power of 2 in size to make allocation and persistent storage management easier.

To the user of the object, the content is always read, written and accessed as clean object content 710. The object store internally stores the object in a form that may include optional compression 711 and/or encryption 712. Thus, what may appear to the user as a 2048 byte object is stored internally as 512 bytes of data (assuming a 4:1 compression ratio), that is further encrypted. An object store is an encryption domain, meaning that all objects are treated similarly with respect to encryption. This is distinct from any encryption that the callers of the object may use.

Figure 8:
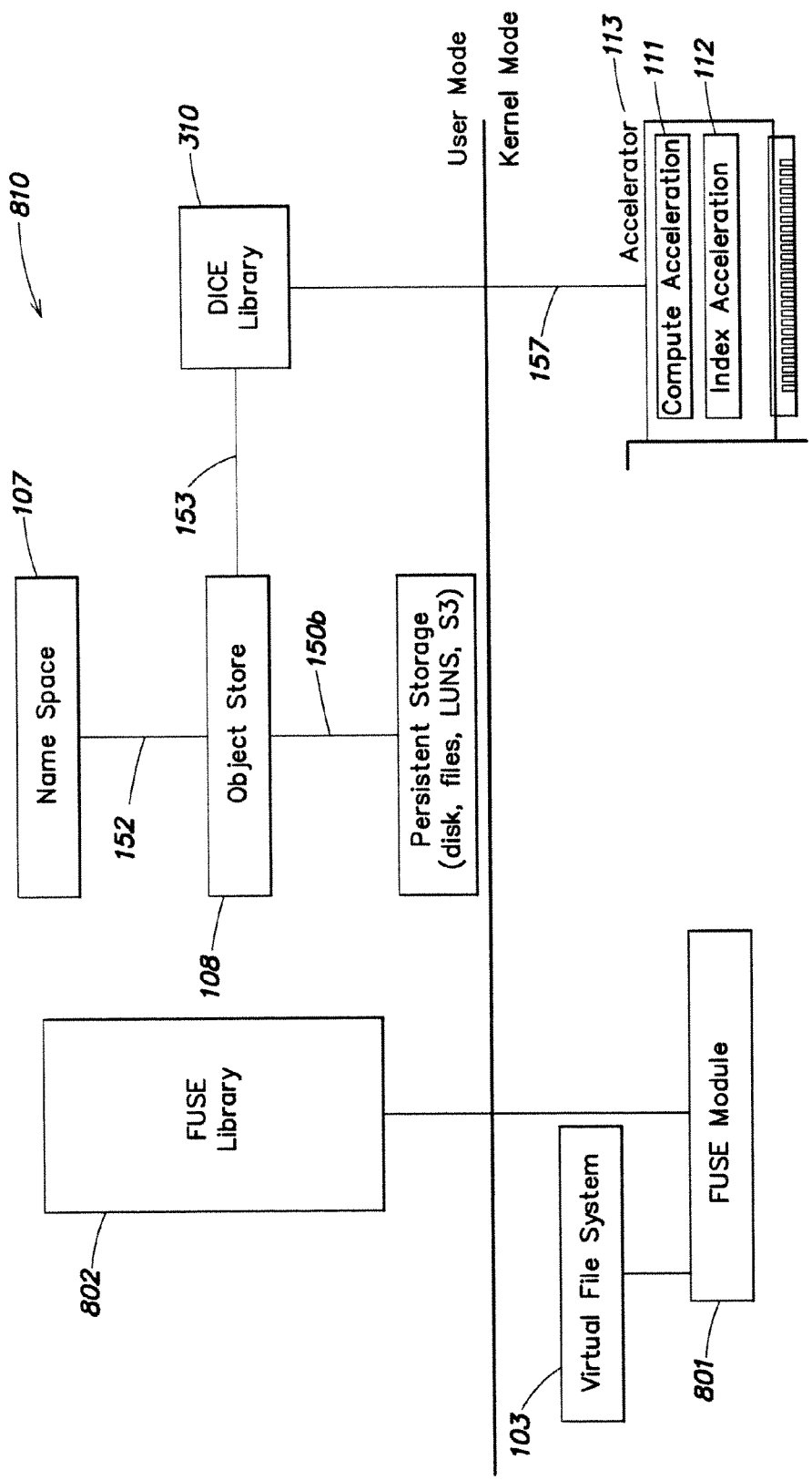
FIG. 8 is a schematic block diagram of an alternative embodiment of the invention implemented in user space with FUSE, File System in User Space; FUSE is an open source set of libraries and kernel modules that enable the construction of file systems in user space.

In FIG. 8, an alternative embodiment of a file system is illustrated that is implemented in user space 100. Using the open source FUSE framework, the namespace file system 107 is linked against the user mode FUSE library 802. The namespace file system has the same private interface 152 to the object store 108. Object store 108 also has the same interface 153 to the DICE library 310. The DICE library may optionally use hardware assist 113. The Vertical File System 103 resides in the kernel 101, as does the hardware assist 113 and the FUSE module 801 (connected to both the VFS 103 and FUSE library 802).

D. Alternative Embodiments

A novel way of building a file system that integrates a combination of features at a fraction of the cost of prior systems has been described above. Various modifications would be apparent to the skilled person in constructing alternative embodiments.

The new file system can be realized in a pure software form, running on a computer as any other file system. Furthermore, the organization of the integrated file system lends itself to unique hardware acceleration techniques that are not possible with legacy file systems. The hardware acceleration enables more performance for a given cost, or a lower total cost of ownership for a given performance level.

In the above embodiment, the file system provides an integrated feature set. The file system is implemented as a stack including two distinct file systems, an object file system and a namespace file system. The stack is fully POSIX® compliant, and can be used wherever a POSIX® compliant file system is called for, such as second extended file system (EXT2), third extended file system (EXT3), ReiserFs, and so forth.

The lower portion of the stack is an object file system. The object based file system is used to host the data in the form of objects. An object is a sequence of opaque, binary data. The object may be raw data, or metadata (e.g., a record of the creation of and any changes to the raw data). Object size can vary, but is typically bounded to a range of a few kilobytes (KBs); however this is not required for correct operation of the invention. The name (also referred to herein as fingerprint) of the object is derived from the object's content using for example a strong cryptographic hash. This enables the object name to be globally unique and identifiable, i.e. a fingerprint of the content. The object file system is primarily machine-oriented.

Two fingerprints that are equal will for all practical purposes represent the same content, regardless of where the fingerprints were calculated. Conversely, two fingerprints that are different represent different content. As fingerprints are significantly smaller than objects (e.g., a factor of 100×, 1000× or more), manipulating fingerprints is often faster and easier than manipulating the underlying content.

The object file system described in the above embodiment is lightweight and flat, distinct from heavyweight object file systems such as described in the ANSI T-I0 spec, or content addressable file systems such as the commercially available EMC Centera®, or Hitachi's product (acquisition via Archivas). Objects, as used here, should not be confused with objects as used in programming languages such as C++ and Java.

Object file systems have an "index" that tracks all of the objects. The construction and management of such an index can be a major challenge for object file systems, where there can be many millions, or even billions of entries in the index.

According to the described embodiment there is provided at the top of a storage stack a namespace file system having files, directories and so forth. A difference from known (e.g., POSIX® file systems) however is that instead of using logical block number addressing (LBN) to access content, object fingerprints are used. Furthermore, all internal data structures of the namespace file system are themselves objects. Thus, the entire storage stack (namespace and object layer) is "knitted" together by object references, and having the fingerprint of the object representing the root enables one to completely and unambiguously define the entire file structure.

Any change (adds, deletes, metadata change, reads) results in the file system's signature being changed. By tracking the root signature, one can thus obtain a complete history of all file system activity.

According to the disclosed embodiment of the invention, the division of labor into two separate components (namespace 107 and object store 108) and how they interact, is done in such a way that de-duplication, snaps, writeable snaps, continuous data protection (CDP), wide area network efficiency, versioning, file system integrity checking and immutability falls out naturally, while still preserving POSIX® semantics.

According to the disclosed embodiment, the organization of the file system enables the application of hardware assist. The hardware assist may take two forms. One form is for compute acceleration, such as compression, encryption and cryptographic digests. The second form is for the construction and maintenance for a large index that is in turn used to build a practical object store.

Significant CPU resources are spent on cryptographic hashing, compression, and encryption. Faster CPU clocks and more CPU cores alleviate this up to a point, but as performance requirements increase, offloading some or all of these functions to dedicated hardware (acceleration) is desirable. There are several commercial chipsets (e.g., Hifn, Cavium) that can accomplish this.

The object store index can be large, and may quickly exceed practical memory limits. A global object index (i.e., an index for all the storage) that is read and written randomly (the primary key for such an index is a cryptographic hash, which have a random distribution), may make paging and caching algorithms ineffective. Placing such an index on faster non-volatile storage, such as a Solid State Disk (SSD) would thus provide performance benefits.

SSDs are constructed such that read rates are significantly higher than write rates (i.e., Seagate xxx can deliver 35,000 iops/read and 3000 iops/write). If index access is evenly divided between reads and writes, then many of the benefits of an SSD are not realized.

A custom built indexing solution, made of FLASH and an FPGA can increase the indexing bandwidth even further. 310 Hardware assist can be managed by the DICE library as previously described.

Embodiments of the invention can be implemented in digital electronic circuitry, or in computer hardware, firmware, software, or in combinations thereof. Embodiments of the invention can be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communications network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

E. Hnode (Content Plus Salt)

In one embodiment, the hnode name is a hash of its content plus salt. Salt is a small value, on the order of 8 to 32 bytes, that is internally and automatically prepended or appended to every object before the signature is calculated. It is not stored when the object is written out.

For example, a user types in a password, from which the salt is generated using any of a variety of standard techniques that are used for cryptographic key generation. A user would protect this password, like any other password. Even if one obtains the sale, it is not computationally possible to generate the original password.

Salt is primarily a defense mechanism against mis-behaved data, in this example where:
every object is tracked using its fingerprint;
fingerprints are stored in an index;
the distribution of fingerprints is flat, i.e. all fingerprints are equally likely to occur;
the indexing algorithms are predicated on a uniform distribution of keys (fingerprints).

If a malicious entity knows that the file system uses a specific fingerprint algorithm, say SHA-1, the entity can easily generate content having fingerprints that fall into a very narrow range. To do so, the entity keeps generating random content, fingerprints it, and keeps only the content that falls into the specified narrow range. That would cause the indexing algorithms to have very poor performance.

However, the nature of cryptographic hashes is such that if you change just 1 bit of an object's content, roughly 50% of the bits of the fingerprint will change. Which 50% is also randomized as you change different bits of the original content.

Adding the salt (i.e., a relatively small change) thus randomizes fingerprints, making it very difficult to "game" the indexing algorithms.

G. Scalable Indexing

Embodiment

The method and apparatus of the invention can be implemented with the following indexing algorithms and memory technology described in copending and commonly owned U.S. Ser. No. 12/823,452 entitled "Scalable Indexing", by the same inventors P. Bowden and A. J. Beaverson, filed on the same date (25 Jun. 2010) as the present application and claiming priority to U.S. Provisional No. 61/269,633 filed 26 Jun. 2009. Priority is claimed herein to both applications and the complete disclosures of each are hereby incorporated by reference in their entirety.

It is to be understood that the foregoing and following descriptions are intended to illustrate and not to limit the scope of the invention.

1. Summary

In accordance with one embodiment of the invention, there is provided a method of accessing an index stored in a non-uniform access memory by a uniform access indexing process, the method comprising:

maintaining a translation table to map a logical bucket identifier generated by the indexing process to a physical bucket location of the memory to access each record data entry in the index;

collecting in cache a plurality of the record data entries, to be written to the index, prior to a subsequent sequential write of the collection of entries to at least one physical bucket location of the memory.

In one embodiment, the method includes:

writing the collection of record data entries from the cache to a bucket location of the memory as a sequential write;

updating the translation table with the bucket location for the record data entries of the collection.

In one embodiment, the method includes:

reading one or more sequential record data entries from the memory to the cache;

designating as free the physical locations in memory from which the one or more entries were read.

In one embodiment, the method includes:

rendering a plurality of sequential physical bucket locations in the memory as a free block by reading any valid entries in the block to the cache and designating as free the physical locations in memory from which such entries were read.

In one embodiment:

the indexing process generates random access requests to the index based on uniformly distributed and unique index keys.

In one embodiment:

the keys comprise cryptographic hash digests.

In one embodiment:

the indexing process comprises a displacement hashing process.

In one embodiment:

the displacement hashing comprises a cuckoo hashing process.

In one embodiment:

the memory comprises one or more of flash, phase-change, and solid state disk memory devices.

In one embodiment:

the memory is limited by one or more of random write access time, random read-modify-write access time, sequential write, alignment restrictions, erase time, erase block boundaries and wear.

In one embodiment:

a size of the physical bucket comprises a minimum write size of the memory.

In one embodiment:

the size of the physical bucket comprises a page or partial page.

In one embodiment:

the memory has an erase block comprising a plurality of pages.

In one embodiment the method includes:

maintaining a bucket valid table for tracking which bucket locations in the memory are valid.

In one embodiment:

a bucket in memory comprises a set of one or more record data entries and a self-index into the bucket translation table.

In one embodiment:

the record data entries in the bucket are not ordered.

In one embodiment the method includes:

designating as read only in cache the record data entries written sequentially to the memory.

In one embodiment:

the bucket translation table is stored in persistent memory.

In one embodiment, the method includes:

tracking the number of free buckets in an erase block and implementing a process to generate a free erase block when a threshold of free buckets is met.

In one embodiment:

the indexing process performs indexing operations based on requests that records be inserted, deleted, looked up and/or modified.

In one embodiment:

the indexing process presents logical bucket operations for reading and writing to physical buckets which store the records of the index.

In one embodiment:

the physical bucket operations include random reads and sequential writes.

In one embodiment:

the physical bucket operations further include trim commands.

In one embodiment:

the memory comprises a physical device layer characterized by non-uniform read and write access and immutability with respect to size, alignment and timing.

In one embodiment:

the record data entry comprises fields for a key, a reference count and a physical block address.

In one embodiment:

the key comprises a cryptographic hash digest of data; the physical block address field contains a pointer to the physical block address of the data stored on a storage device.

In one embodiment:

the logical bucket locations are generated by a plurality of hash functions.

In one embodiment:

the memory comprises a flash memory device which includes a plurality of erase blocks, each erase block comprises a plurality of pages, and each page comprises a plurality of buckets.

In accordance with another embodiment of the invention, there is provided a computer program product comprising program code means which, when executed by a processor, performs the steps of the foregoing method.

In accordance with another embodiment of the invention, there is provided a computer-readable medium containing executable program instructions for a method of accessing an index stored in a non-uniform access memory by a uniform access indexing process, the method comprising:

maintaining a translation table to map a logical bucket identifier generated by the indexing process to a physical bucket location of the memory to access each record data entry in the index;

collecting in cache a plurality of the record data entries, to be written to the index, prior to a subsequent sequential write of the collection of entries to at least one physical bucket location of the memory.

In accordance with another embodiment of the invention, there is provided a system comprising:

physical processor and memory devices including a computer-readable medium containing executable program instructions for a method of accessing an index stored in a non-uniform access memory by a uniform access indexing process, the method comprising:

maintaining a translation table to map a logical bucket identifier generated by the indexing process to a physical bucket location of the memory to access each record data entry in the index;

collecting in cache a plurality of the record data entries, to be written to the index, prior to a subsequent sequential write of the collection of entries to at least one physical bucket location of the memory.

In one embodiment:

the memory that stores the index comprises a physical device layer characterized by non-uniform read and write access and immutability with respect to size, alignment and timing.

In one embodiment:

the memory that stores the index comprises one or more of flash, phase-change and solid state disk memory devices.

In one embodiment:

the memory that stores the index comprises a flash memory device which includes a plurality of erase blocks, each erase block comprises a plurality of pages, and each page comprises a plurality of buckets.

In accordance with another embodiment of the invention, there is provided a method of accessing an index stored in a non-uniform access memory by a uniform access indexing process, the method comprising:

providing to a translation table, which maps a logical bucket identifier to a physical bucket location of the memory for each record data entry in the index, logical bucket identifiers generated by the indexing process;

accessing physical bucket locations mapped to the logical bucket identifiers;

collecting in a cache record data entries to be written to the index;

subsequently writing sequentially a collection of the record data entries from the cache to the index in at least one new physical bucket location of the memory; and updating the translation table to associate the at least one new physical bucket location with a logical bucket identifier.

In accordance with another embodiment of the invention, there is provided a computer system comprising:

a non-uniform access memory in which is stored an index comprising record data entries in physical bucket locations of the memory;

a translation table to map a logical bucket identifier generated by a uniform access indexing process to a physical bucket location of the memory for each of the record data entries;

a cache for collected record data entries to be written to an index;

means for accessing physical bucket locations of the memory mapped to logical bucket identifiers supplied to the translation table by the indexing process;

means for writing sequentially a collection of the record data entries from the cache to the index at least one physical bucket location of the memory; and means for updating the translation table to associate the at least one physical bucket location with a logical bucket identifier.

2. Drawings

Figure 9:
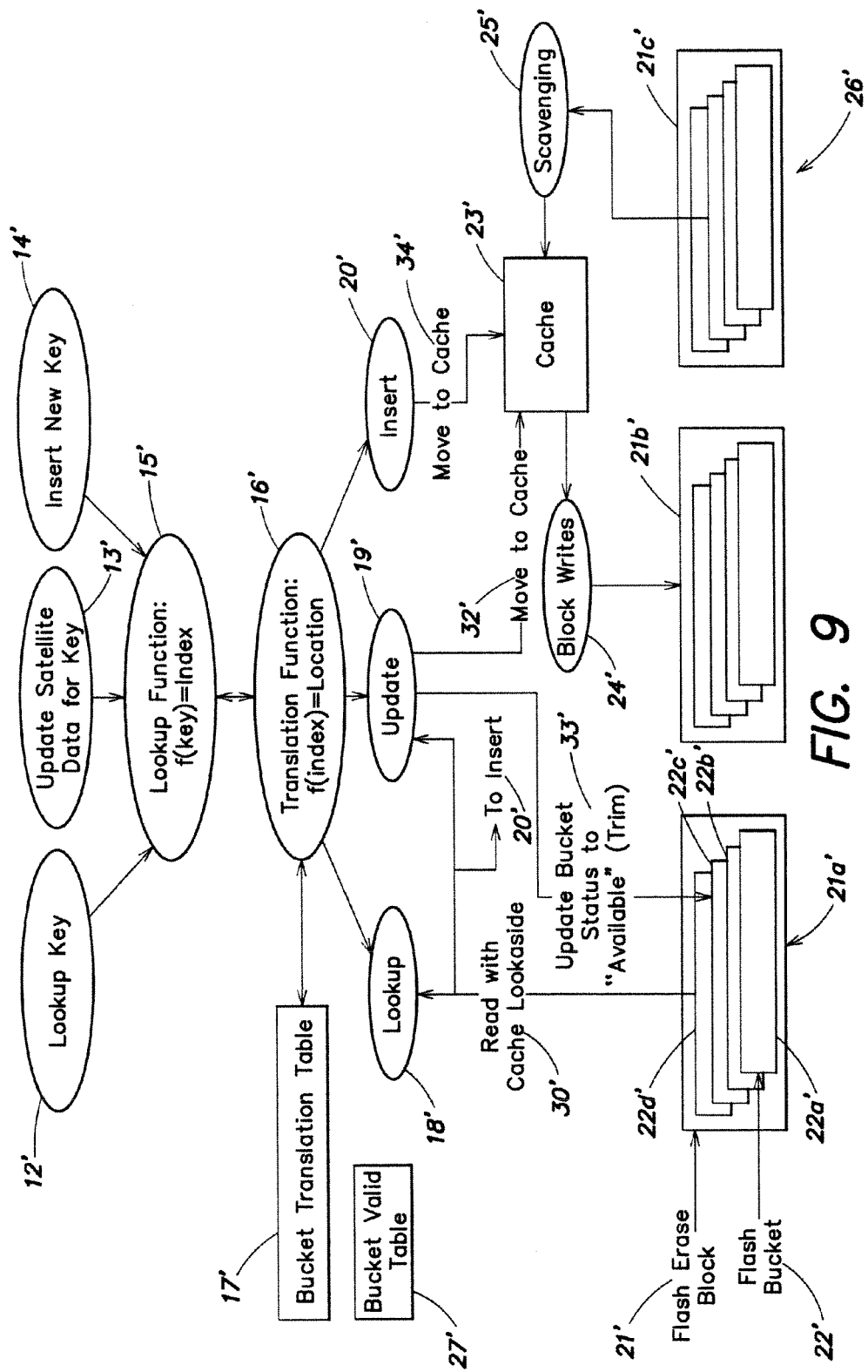
FIG. 9 is a schematic block diagram illustrating various indexing operations performed in accordance with one embodiment of an indexing invention.
Figure 11:
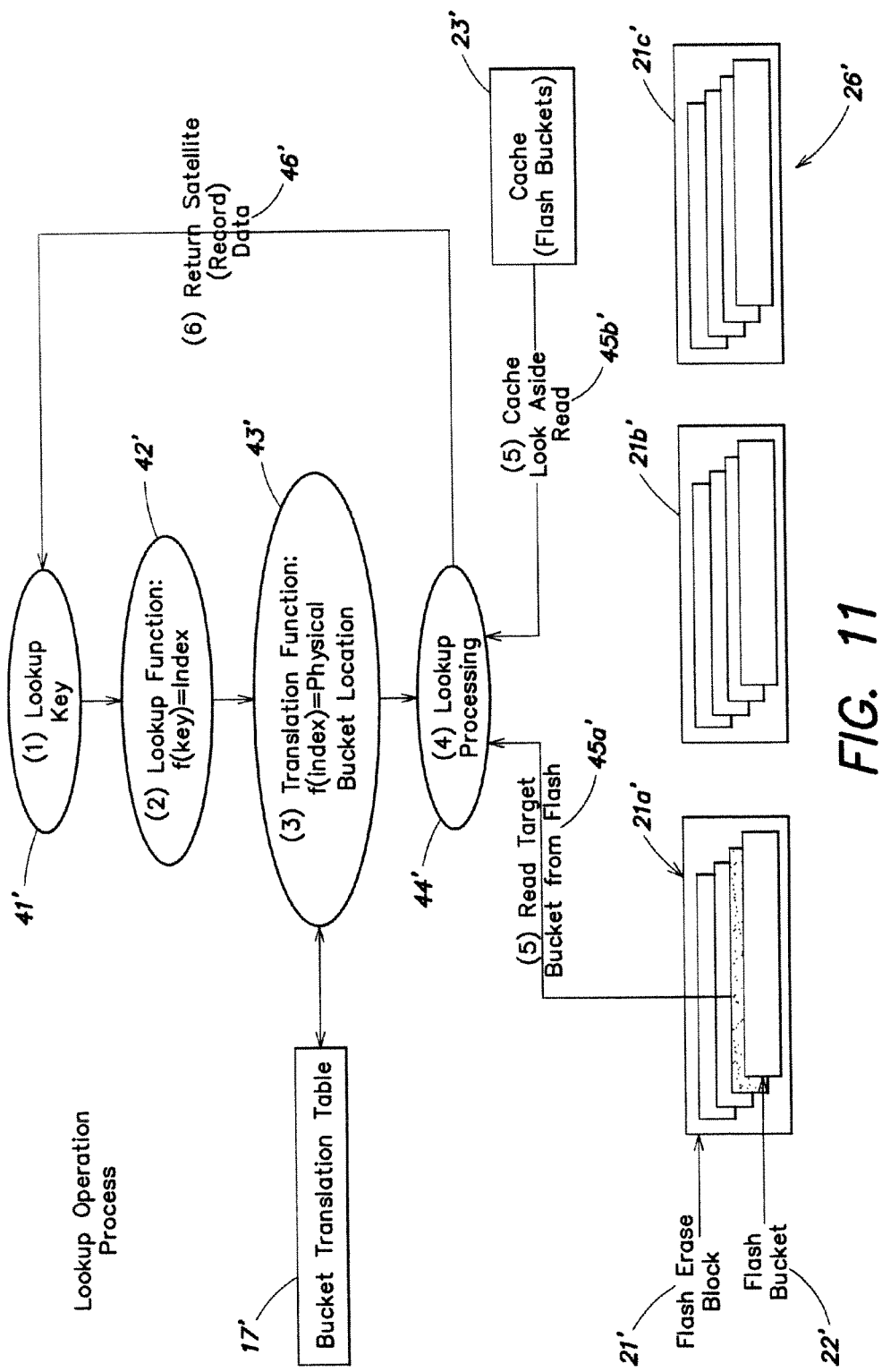
FIG. 11 is a schematic block diagram illustrating a lookup operation according to one embodiment of the invention.
Figure 12:
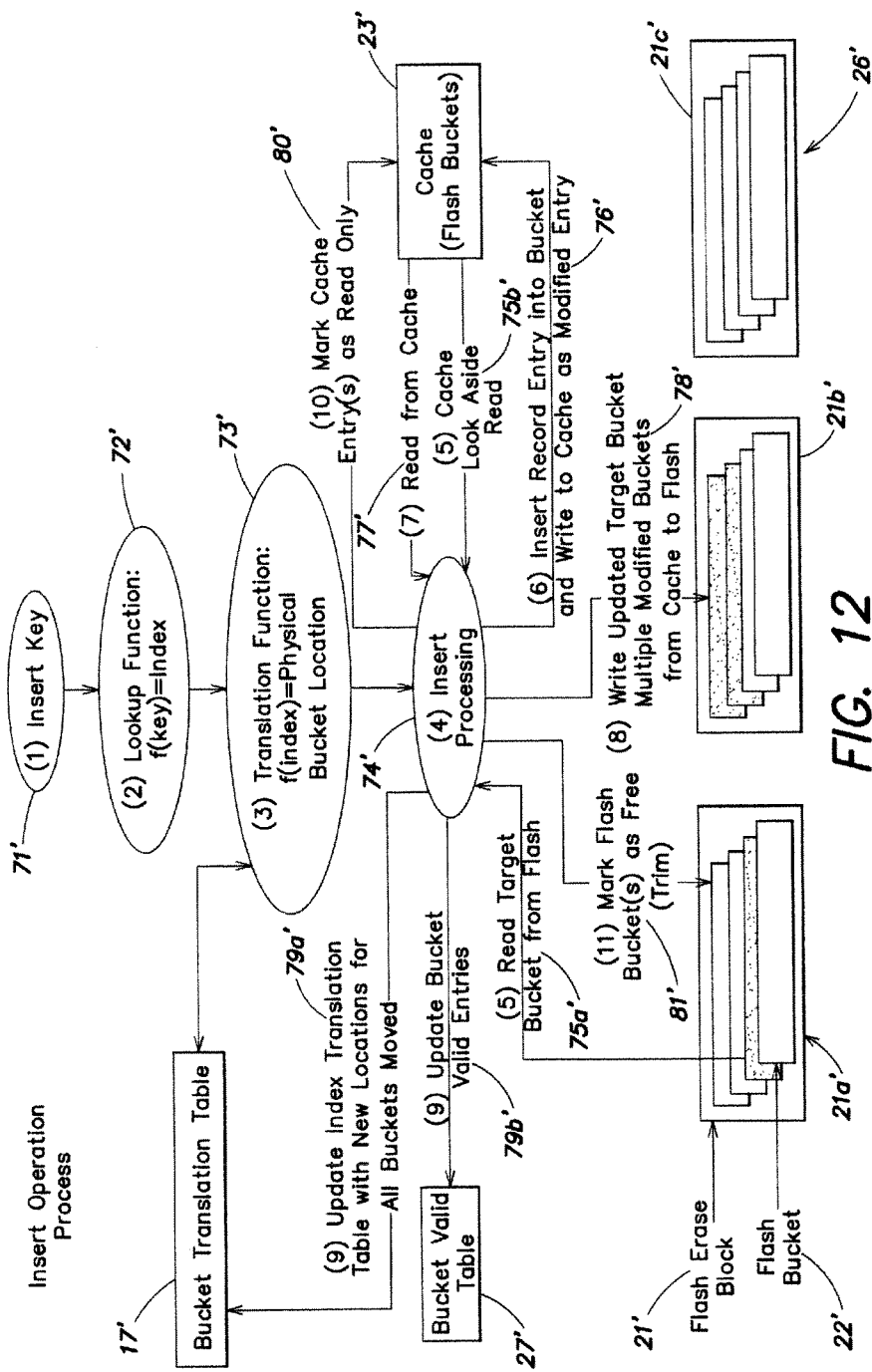
FIG. 12 is a schematic block diagram illustrating an insert operation according to one embodiment of the invention.
Figure 13:
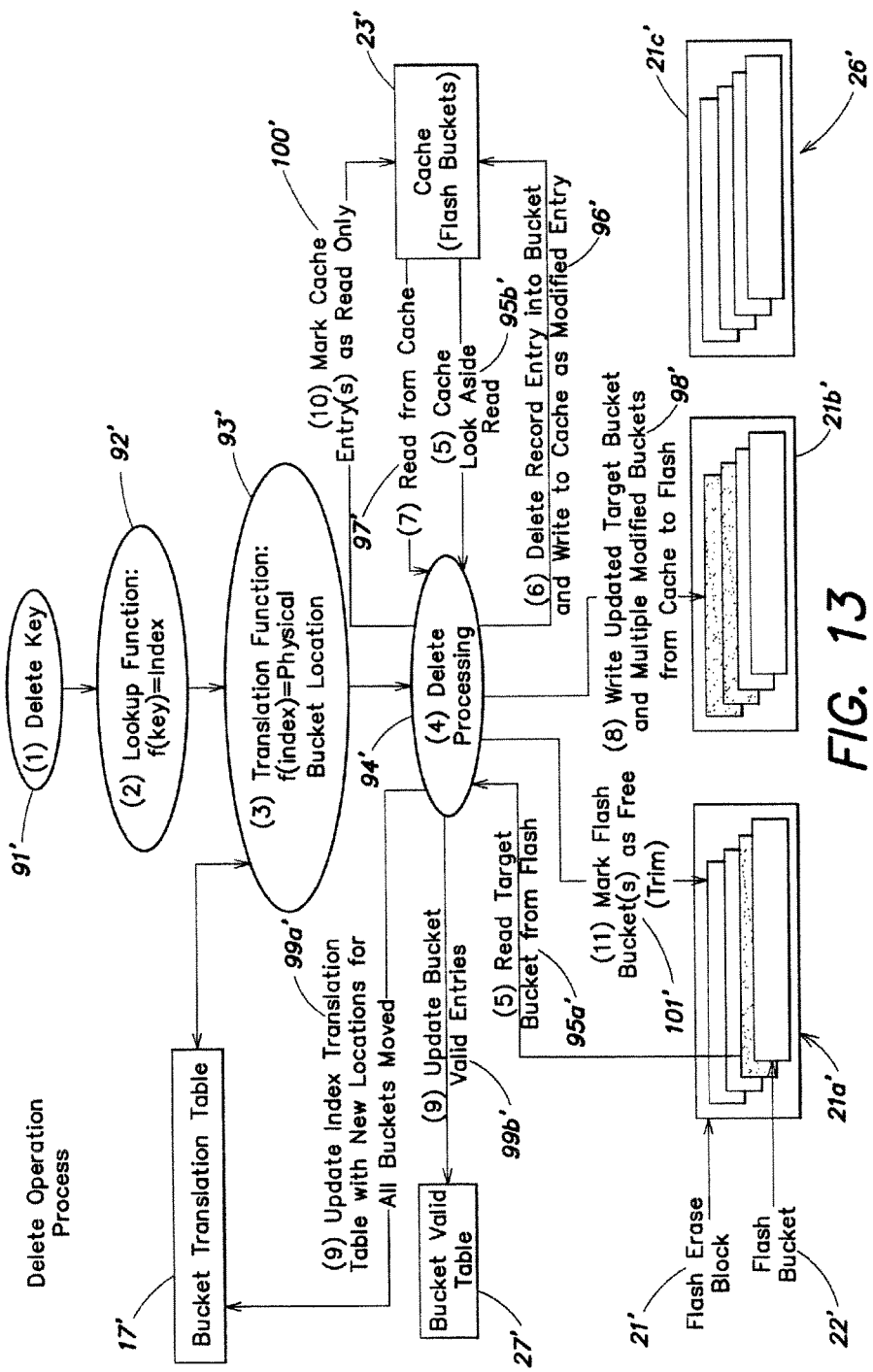
FIG. 13 is a schematic block diagram of a delete operation according to one embodiment of the invention.
Figure 14:
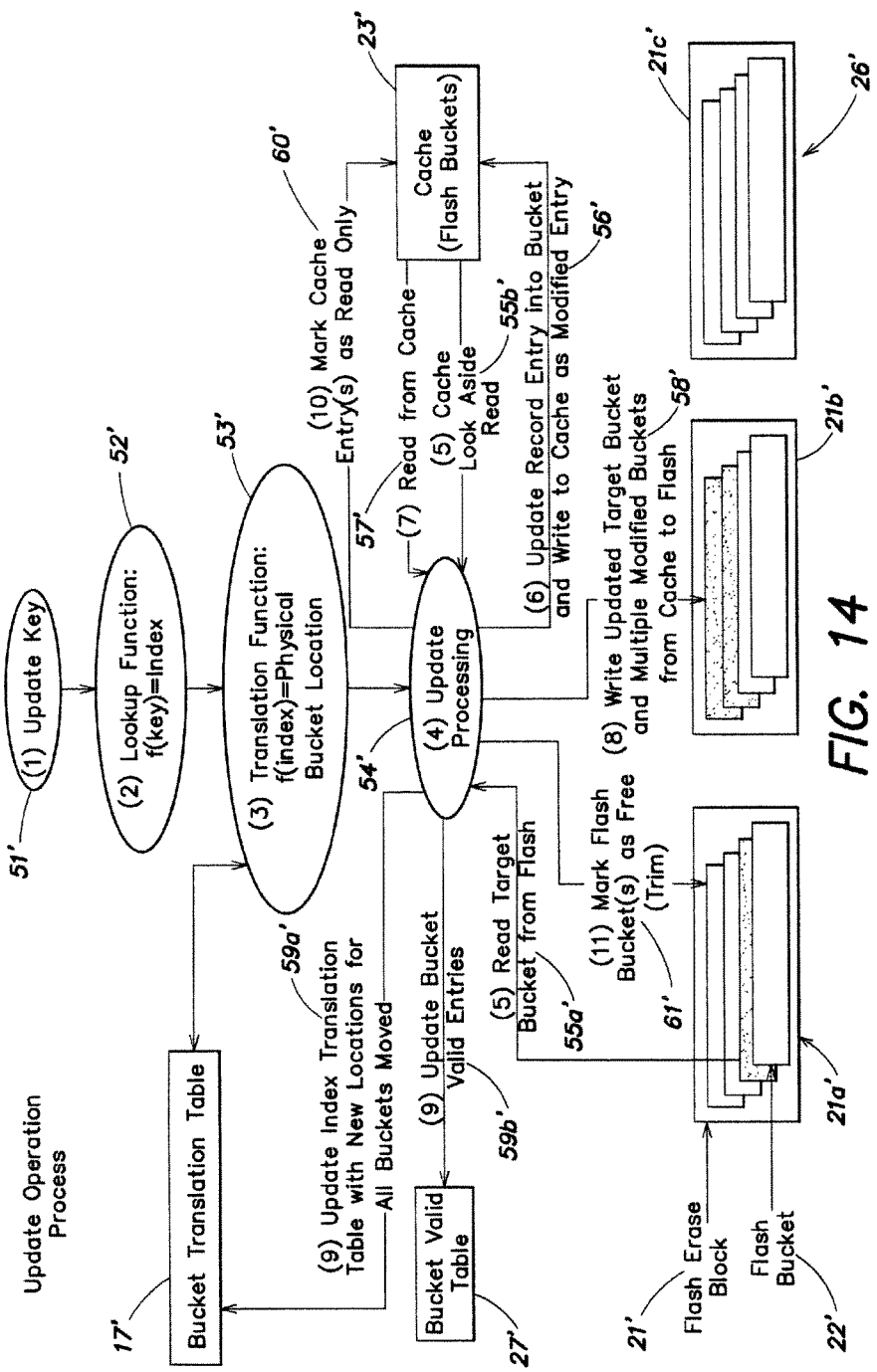
FIG. 14 is a schematic block diagram of an update operation according to one embodiment of the invention.
Figure 15A:
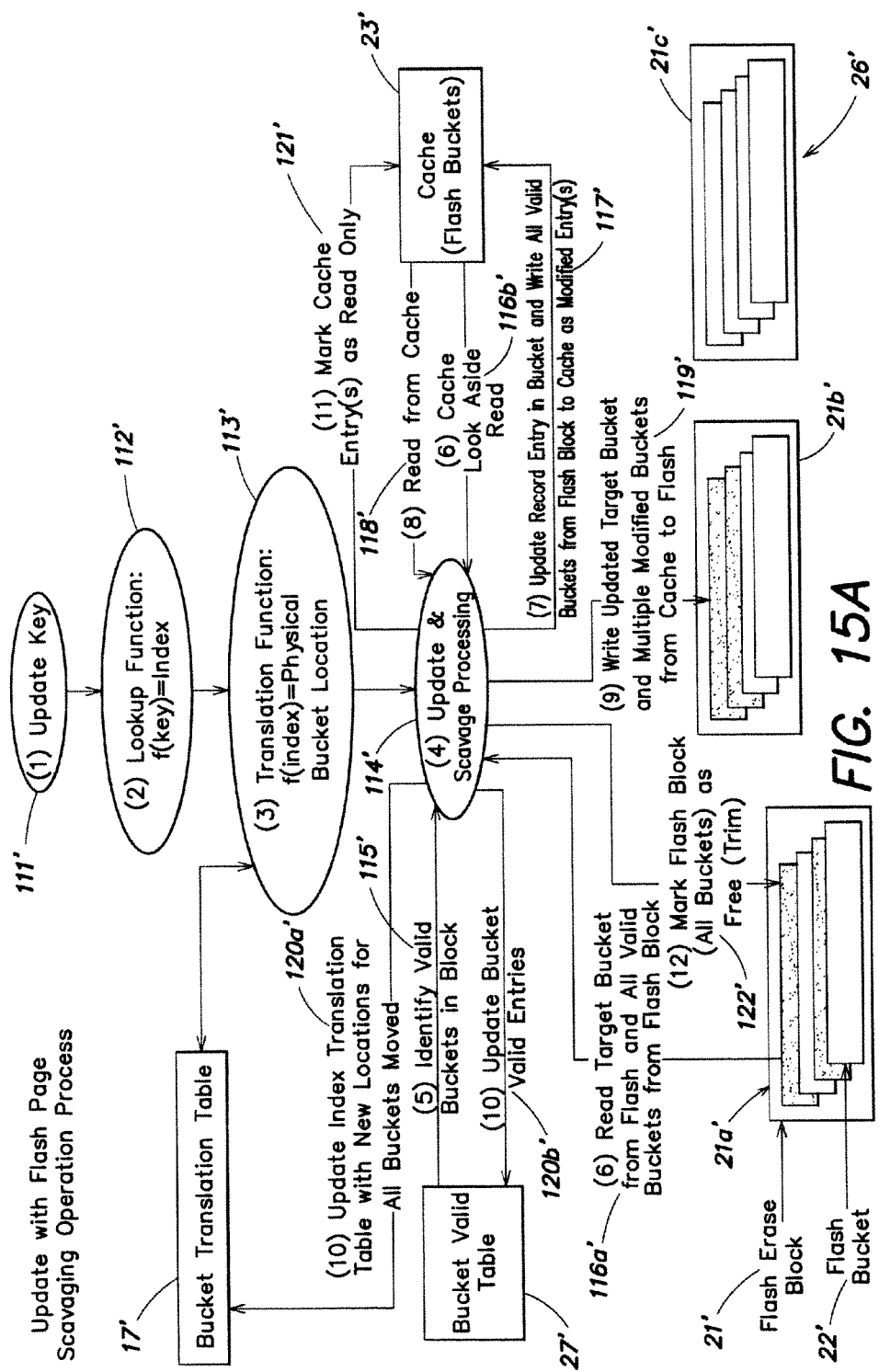
FIGS. 15A and 15B are schematic block diagrams illustrating a random read process for generating free erase blocks according to one embodiment of the invention.
Figure 15B:
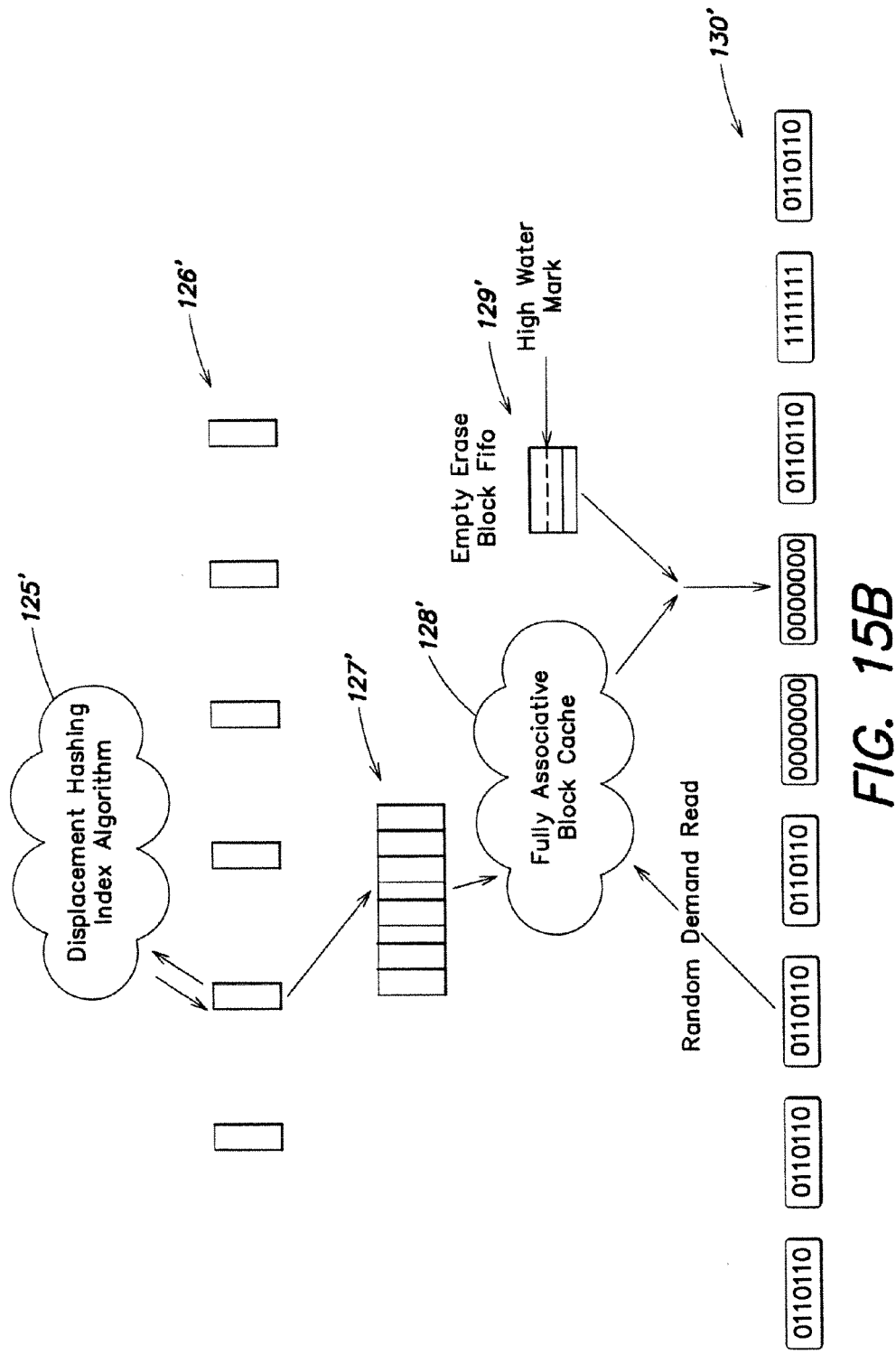
Figure 16A:
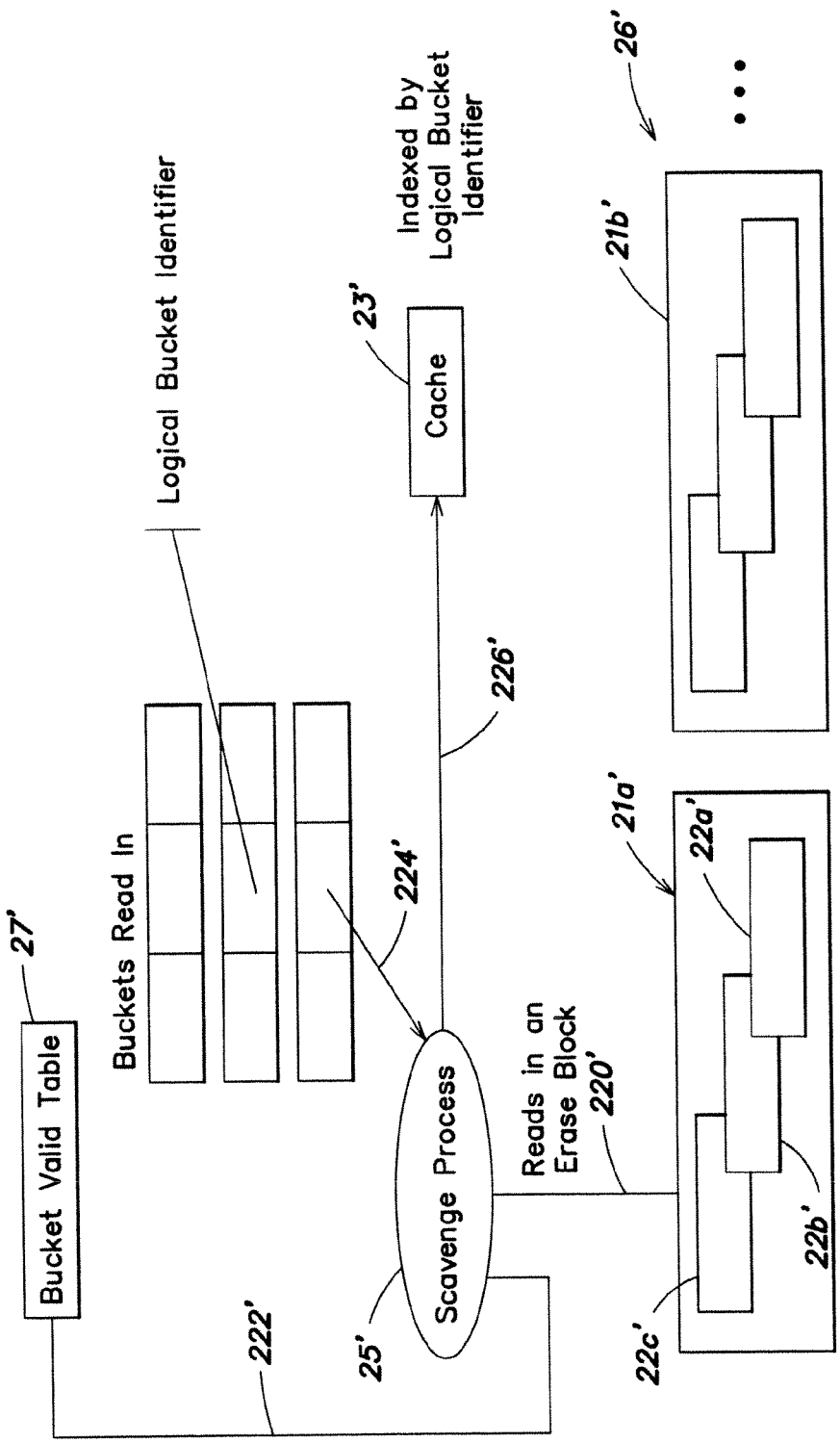
FIGS. 16A and 16B are schematic block diagrams illustrating another method of generating free erase blocks according to a scavenging process.
Figure 16B:
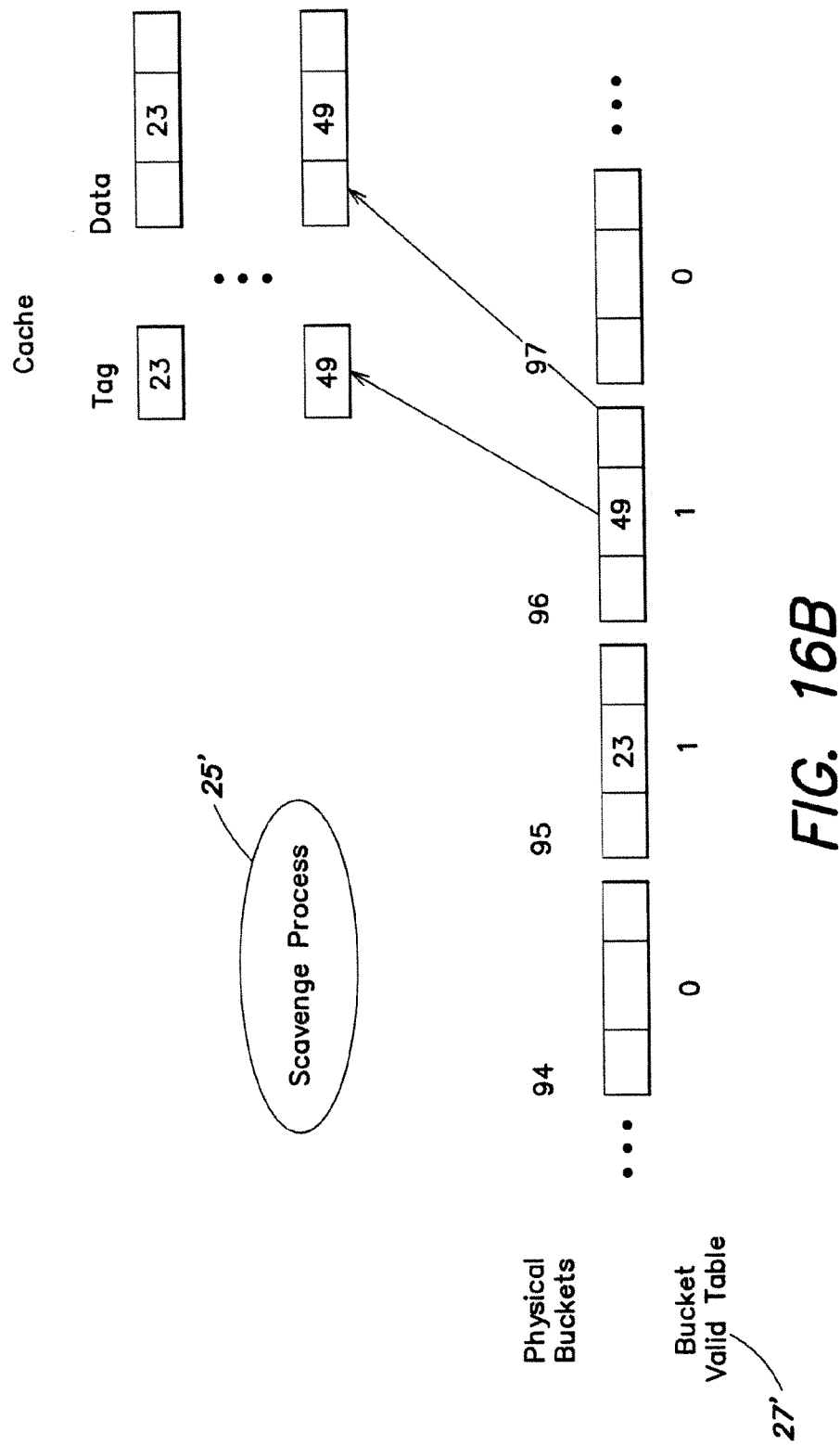
Figure 17:
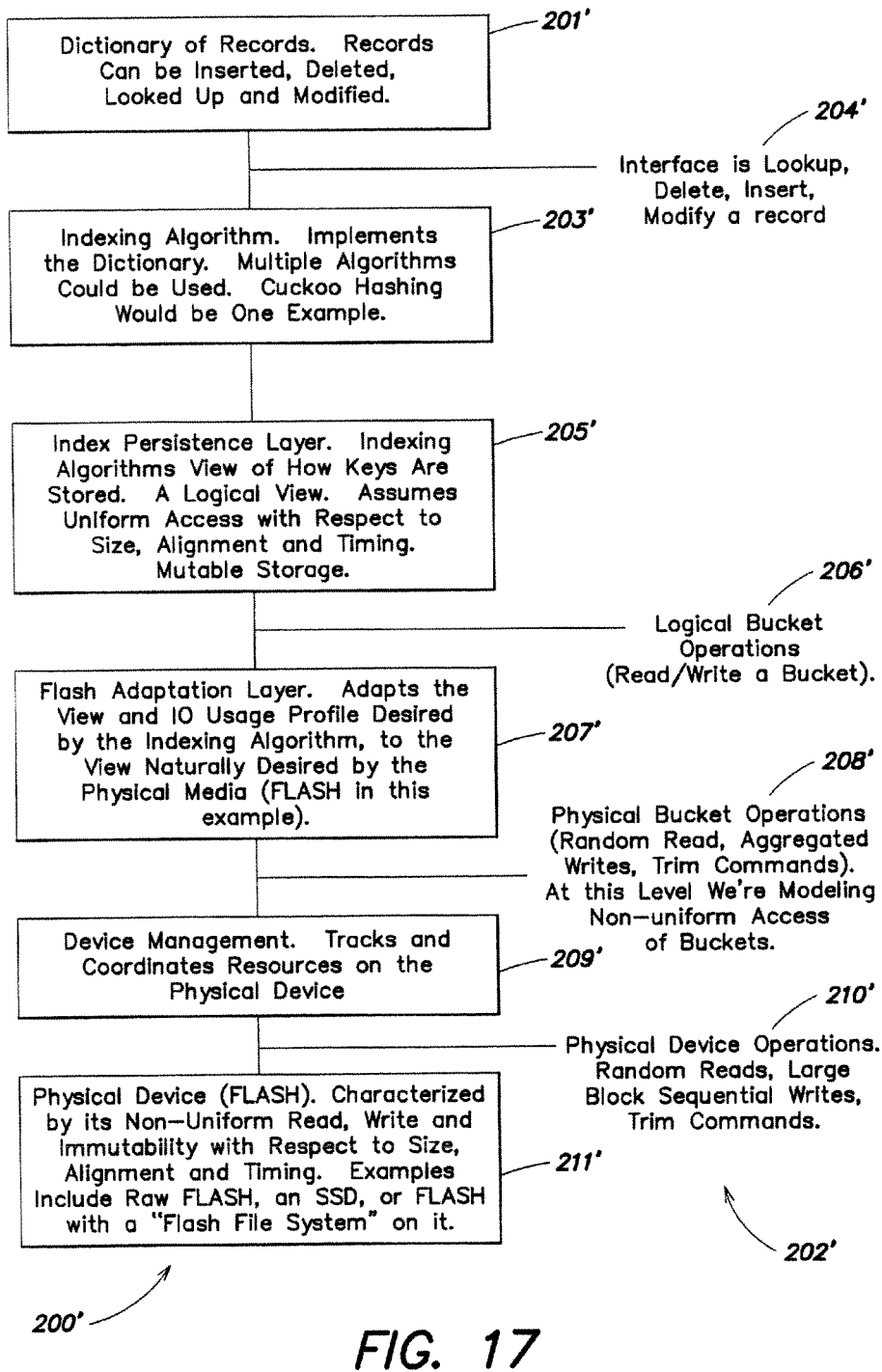
FIG. 17 is a schematic block diagram illustrating a six layer view or stack for illustrating an implementation of the invention.
Figure 18:
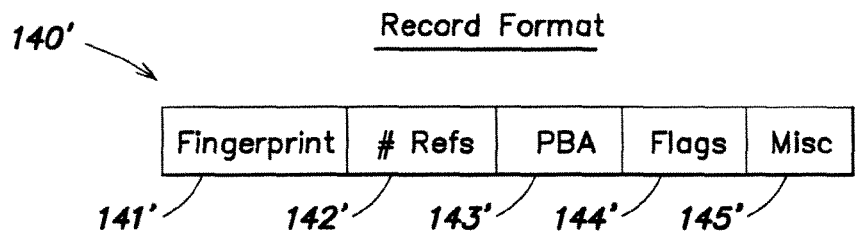
FIG. 18 is a schematic diagram of a record entry as used in one embodiment of the invention.
Figure 20:
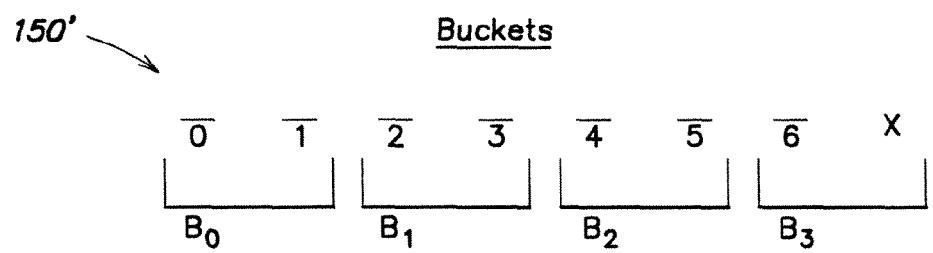
FIG. 20 is a schematic illustration of multiple buckets, each bucket holding multiple records according to one embodiment of the invention.
Figure 21:
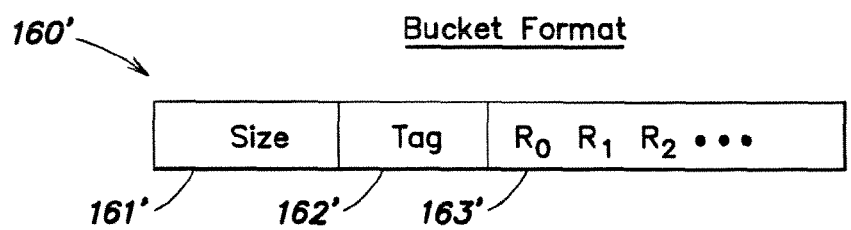
FIG. 21 is a schematic diagram of the contents of a bucket according to one embodiment of the invention.
Figure 22:
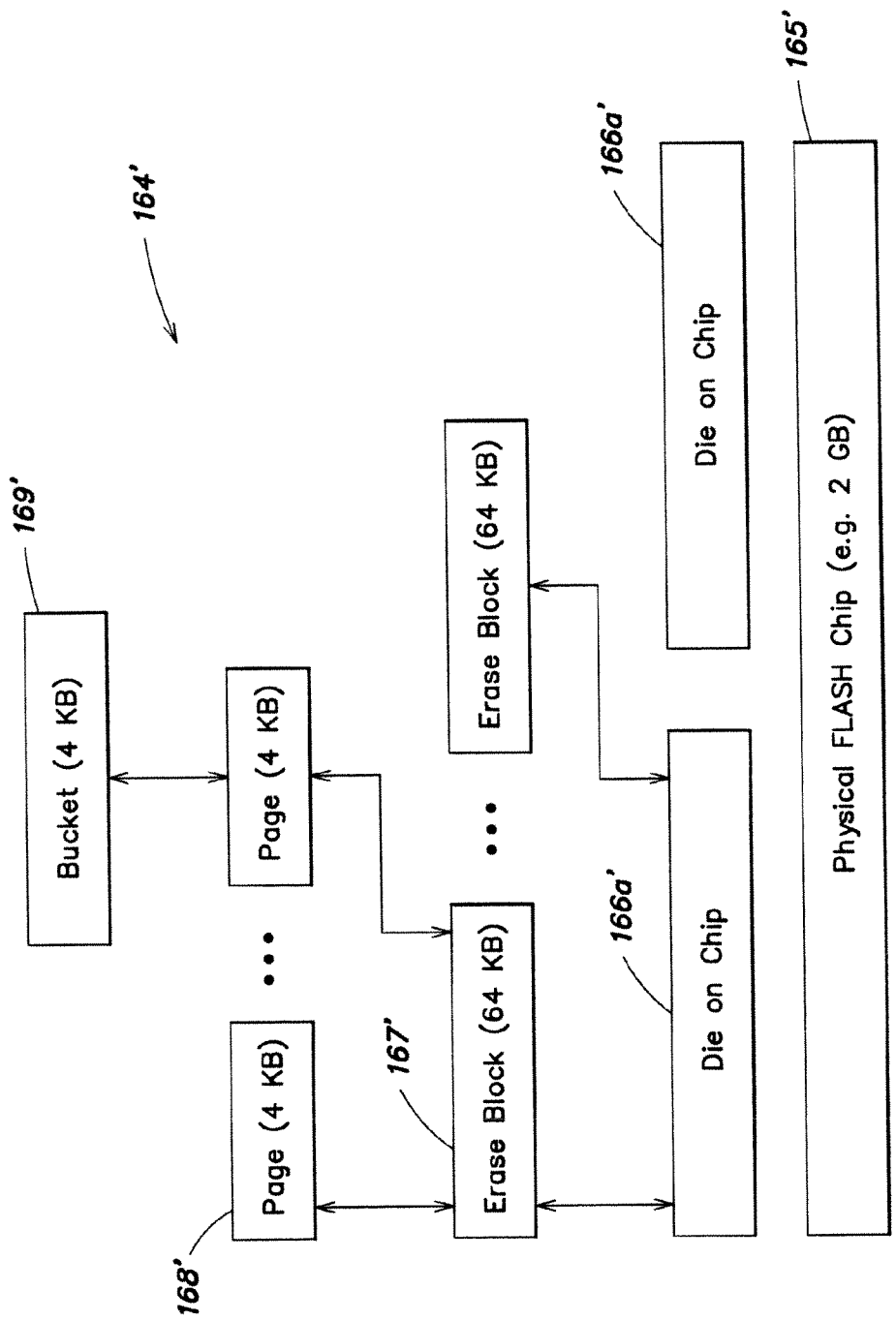
FIG. 22 is a schematic block diagram illustrating one example of a physical flash chip having multiple dies, erase blocks, pages, and buckets according to one embodiment of the invention.
Figure 23A:
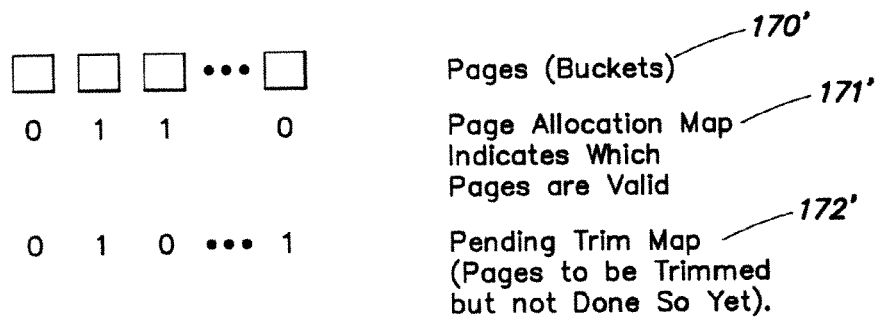
FIGS. 23A-23B illustrate certain components of a device management layer according to one embodiment of the invention.
Figure 23B:
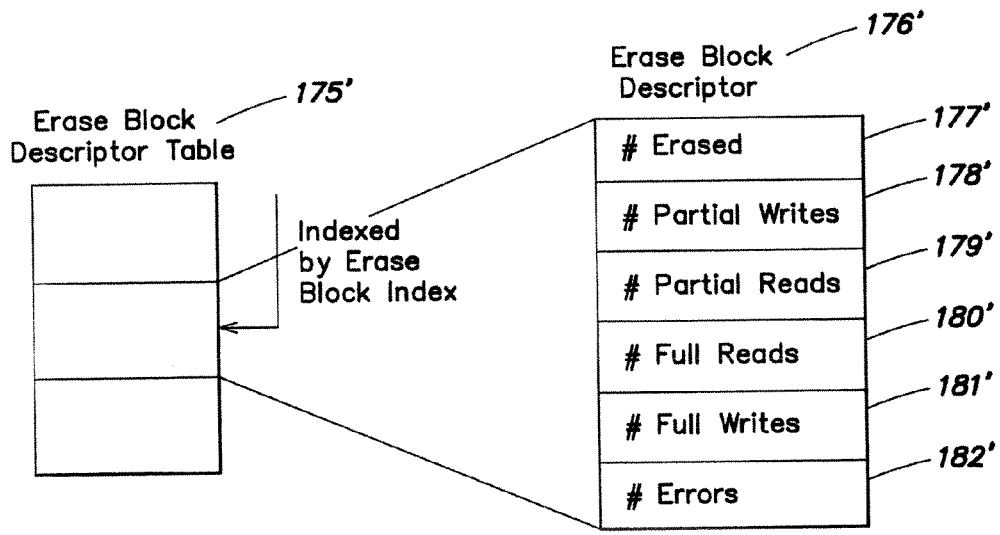

The indexing invention will be more fully understood by reference to the detailed description, in conjunction with the following figures:

FIG. 9 is a schematic block diagram illustrating various indexing operations performed in accordance with one embodiment of the present invention;

FIGS. 10A through 10D illustrate various embodiments of data structures which may be used in the present invention;

FIG. 11 is a schematic block diagram illustrating a lookup operation according to one embodiment of the invention;

FIG. 12 is a schematic block diagram illustrating an insert operation according to one embodiment of the invention;

FIG. 13 is a schematic block diagram of a delete operation according to one embodiment of the invention;

FIG. 14 is a schematic block diagram of an update operation according to one embodiment of the invention;

FIGS. 15A and 15B are schematic block diagrams illustrating a random read process for generating free erase blocks according to one embodiment of the invention;

FIGS. 16A and 16B are schematic block diagrams illustrating another method of generating free erase blocks according to a scavenging process;

FIG. 17 is a schematic block diagram illustrating a six layer view or stack for illustrating an implementation of the present invention;

FIG. 18 is a schematic diagram of a record entry as used in one embodiment of the invention;

FIGS. 19A-19E illustrate schematically an implementation of cuckoo hashing according to one embodiment of the invention;

FIG. 20 is a schematic illustration of multiple buckets, each bucket holding multiple records according to one embodiment of the invention;

FIG. 21 is a schematic diagram of the contents of a bucket according to one embodiment of the invention;

FIG. 22 is a schematic block diagram illustrating one example of a physical flash chip having multiple dies, erase blocks, pages, and buckets according to one embodiment of the invention; and FIGS. 23A-23B illustrate certain components of a device management layer according to one embodiment of the invention.

3. Overview

According to one or more embodiments of the invention, specialized memory technology and algorithms are used to build indices that simultaneously have large numbers of records and transaction requirements. One embodiment utilizes a displacement hashing indexing algorithm, for example cuckoo hashing. The invention enables use of non-uniform access memory technologies such as flash, phase-change and solid state disk (SSD) memory devices.

In various embodiments of the invention, new data structures and methods are provided to insure that an indexing algorithm performs in a way that is natural (efficient) to the algorithm, while the memory device sees IO (input/output) patterns that are efficient for the memory device.

One data structure, an indirection table, is created that maps logical buckets as viewed by the indexing algorithm to physical buckets on the memory device. This mapping is such that write performance to non-uniform access memory devices is enhanced.

Another data structure, an associative cache, is used to collect buckets and write them out sequentially to the memory device, as part of the cache's eviction and write-back policies.

Methods are used to populate the cache with buckets (of records) that are required by the indexing algorithm. Additional buckets may be read from the memory device to cache during a demand read, or by a scavenging process.

Use of the cache, in conjunction with the indirection table, allows large sequential writes to the memory device.

While flash technology has the fundamental capability of achieving the needed capacity and IO rates for the indexing problem, flash access characteristics are non-uniform. This non-uniformity is significant enough that normal indexing algorithms work poorly, if at all, with a flash memory device.

The non-uniform access flash memory that is used in the present invention is an electrically-erasable programmable read-only memory (EEPROM) that must be read, written to and erased in large block sizes of hundreds to thousands of bits, i.e., no. byte level random access. Physically, flash is a non-volatile memory form that stores information in an array of memory cells made from floating-gate transistors. There are two types of flash memory devices, NAND flash and NOR flash. NAND flash provides higher density and large capacity at lower cost, with faster erase, sequential write and sequential read speeds, than NOR flash. As used in this application and in the present invention, "flash" memory is meant to cover NAND flash memory and not NOR memory. NAND includes both single-level cell (SLC) devices, wherein each cell stores only one bit of information, and newer multi-level cell (MLC) devices, which can store more than one bit per cell. While NAND flash provides fast access times, it is not as fast as volatile DRAM memory used as main memory in PCs. A flash memory device may or may not include a flash file system. Flash file systems are typically used with embedded flash memories that do not have a built-in controller to perform wear leveling and error correction.

A typical NAND flash chip may store several GB of content. Unlike memory attached to a computer, the memory on the flash chip must be accessed in certain sizes and on certain boundaries. Furthermore, once a section of memory has been written, an erase operation must be performed before those memory locations can be written to again. Also, locations wear out, so insuring that all locations get a similar number of writes further complicates the usage. Read times, write times, and erase times can vary significantly (from micro seconds to milliseconds). Thus the timing, wear leveling and alignment restrictions make the practical use of flash difficult at best.

A flash memory device may contain one or more die (silicon wafers). Each die, for the most part, can be accessed independently.

A die is composed of thousands of erase blocks. An erase block is typically 128-512 KB in size. When data needs to be cleared, it must be cleared on erase block boundaries.

Another limitation of NAND flash is that data can only be written sequentially. Furthermore, the set up time for a write is long, approximately 10× that of a read.

Data is read on page granularity. A page may range from 1 KB to 4 KB depending on the particular flash chip. Associated with each page are a few bytes that can be used for error correcting code (ECC) checksum.

Data is written on page granularity. Once written, the page may not be written again until its erase block (containing the page) is erased. An erase block may contain several dozen to over 100 pages.

One exception to the above read and write page granularity are sub-page writes, or partial page programming. Depending on the technology, pages may be partially written up to 4 times before an erasure is required.

Since pages in a NAND flash block may be written sequentially and only once between block erase operations, subsequent writes require a write to a different page, typically located in a different flash block. The issue of block erases is handled by creating a pool of writeable flash blocks, a function of the flash file system.

Erasing an erasure block is the most expensive operation time-wise, as it can take several milliseconds. For devices that are heavily used (traffic-wise), the speed at which erase blocks can be generated (i.e. how fast free erase blocks can be made available) is often a limiting factor in flash design.

Many SSD (Solid State Disks) use flash technology. The firmware in the SSD handles the aforementioned access issues in a layer called the Flash Translation Layer (FTL). In doing so, however, the firmware makes assumptions about how the SSD will be used (e.g., mostly reads, mostly writes, size and alignment of reads and writes), and as a result of these assumptions, the SSD's performance characteristics are often sub-optimal for indexing algorithms.

Many indexing algorithms that one finds in the literature and in practice are based on a uniform memory access model, i.e. all memory is equally accessible time-wise for both reads and writes, and there are not any first order restrictions on access size or alignment.

If one considers an indexing solution, operations such as insert, delete, lookup and modify typically require more and varied amounts of time, and reads and writes of blocks, typically small blocks (4 KB or so), less time. The blocks appear to be random, i.e., any block may be read, and any other block may be written. With some algorithms, there are random read-modify-write IO profiles, i.e. a random block is read, and then written back to the same location with slightly modified data.

This random IO that an indexing algorithm needs to operate efficiently, is not what flash is intended to provide. While flash can handle random reads well, random writes are difficult, as are read-modify-writes. The reason for this is that one cannot over-write something that has already been written, one has to erase it first. To further complicate the situation, erasing takes time, and must happen on large boundaries (typical 64 KB).

When an erase block is erased, any valid data in that block needs to be moved elsewhere. If the algorithm writes random 4 KB blocks across the flash device, a naïve implementation would result in blocks being erased all the time. As erase times are slow, the performance would suffer significantly.

In accordance with the invention, to allow writes to the flash to be sequential, while still preserving the logical random access that the indexing algorithm expects, a translation or indirection table is created. This table maps logical buckets (of records) as needed by the indexing algorithm to physical buckets (e.g., pages) of the flash device.

As the indexing algorithm reads in buckets (e.g., pages of data from flash), in order to modify the bucket contents (insert, update or delete operations), the buckets are moved to a cache. The corresponding buckets on the flash device can now be marked as not valid (free). In the case of an SSD, this can take the form of a TRIM command.

According to further embodiments of the invention, methods are provided to generate free erase blocks. At any given time, an erase block may have a combination of valid and invalid data. To free up an erase block, all valid data must be moved off that block. There are two mechanisms that can be used to accomplish this. One is to use the random reads generated by the indexing algorithm to read more (than is required by the indexing algorithm) so as to free up an erase block. As the indexing algorithm tends to generate random reads, over time all erase blocks are eventually read and harvested for empty pages. For example, if the erase block containing the read has some free pages, and some valid pages, then the algorithm may choose to read in the entire erase block and place all valid pages into the cache. This has the effect of freeing up that erase block for a subsequent erase and then write.

Alternatively, e.g., if the aforementioned random read process is not fast enough, a separate scavenging process (e.g., thread) can be used to read erase blocks, and place the valid pages into the cache for coalescing into another erase block.

As the cache fills up, entries must be written out. A set of cache entries is collected that will be sequentially written to a contiguous set of partial pages (if partial page writes are allowed by the flash device), multiple pages, and/or one or more erase blocks. As cache entries are written to the flash device, the indirection table is updated, so that the indexing algorithm still sees the entries as being at a fixed logical address.

4. Indexing Operations

Various embodiments of the invention will now be described utilizing the accompanying FIGS. 9-14 to illustrate various indexing operations performed in accordance with the present invention. FIGS. 15-16 illustrate two methods of generating free erase blocks for efficient utilization of the storage medium (e.g., flash memory). These embodiments are meant to be illustrative and not limiting.

FIG. 9 is an overview of several indexing operations that utilize a bucket translation table 17' and cache 23' according to one embodiment of the invention. At the top of FIG. 9, three index operations 12'-14' are shown as alternative inputs to a lookup function 15' and a translation function 16'. A first index operation 12' is "lookup key" for returning satellite data from (a record entry) for the key. A second index operation 13' is "update satellite data for key" for updating (modifying) the record entry for the key. A third index operation 14' is "insert new key" for inserting a new record entry. Another index operation, delete, is not shown in FIG. 9 but described below in regard to FIG. 13.

All three index operations first perform a lookup function 15', wherein some function of the key f(key) is used to generate an index, here a logical bucket identifier that supports (e.g., speeds up) a hash table lookup. The bucket identifier (index) is input to a translation function 16' wherein some function of the logical bucket identifier f(index) generates a physical bucket location in the flash memory. The translation function is implemented by a bucket translation table 17', which is a map of the logical bucket identifier (as provided by the indexing algorithm) to a target flash memory location (physical bucket location in flash). A dictionary (index) stored in flash memory 26' may comprise records that map a lookup key (e.g., object name) to satellite data (e.g., location pointer to the object stored on disk).

Next, depending upon which of the three indexing operations is being performed (lookup, update or insert) one or more of the steps shown on the bottom half of FIG. 9 are performed.

For a lookup operation 18', the bucket entry identified by the translation function is read 30' from the target bucket 22' in flash memory, with a cache lookaside (e.g., if the target bucket is stored in cache, it may be read from cache 23' rather than from flash memory 26').

For an update operation 19', the bucket entry identified by the translation function (the original bucket entry) is read 30' from a target bucket 22' in erase block 21a' of flash memory (or cache), the bucket is updated and moved 32' to cache, and in a subsequent write 24' a plurality of cache bucket entries are read sequentially to a contiguous set of partial pages, multiple pages and/or erase blocks (e.g. a new erase block 21b') in flash memory. The process updates 33' the status of all the moved buckets in flash to not valid data (e.g., free or available for a trim operation).

For an insert operation 20', a target bucket is again read from flash and a modified bucket entry is moved 34' to cache, again for a subsequent sequential write 24' to a new location in flash memory.

FIG. 9 shows schematically a cache 23' for collecting a plurality of bucket entries, prior to performing a sequential write 24' of the collection of cache bucket entries to contiguous flash memory buckets. In one embodiment, a scavenging operation 25' is used for creating free erase blocks; the process includes storing any valid buckets (from the erase block) in cache during the scavenging process and reallocating the flash erase block as free.

Following a discussion of the new data structures illustrated in FIG. 10, the indexing operations referenced in FIG. 9 will be more specifically described with respect to the flow diagrams of FIGS. 11-14.

5. Data Structures

FIG. 10 illustrates various embodiments of data structures useful in the present invention. Such data structures are meant to be illustrative and not limiting.

FIG. 10A illustrates one embodiment of a bucket translation table (BTT) 300' for translating a logical bucket index (generated by the indexing algorithm) to a physical flash bucket address. A BTT table entry is shown having three fields: valid 301'; flash physical bucket address 302'; and extended bucket state 303'. The bucket address granularity is the minimum write size of the flash device, namely either a partial page write (e.g., for SLC NAND) or a page write (e.g., for MLC NAND). The BTT is 1:1 mapping of logical to physical bucket entries. The table enables reorganization of the flash bucket assignments for higher random performance (random reads and random writes by the indexing algorithm). Additional state information may be added to the BTT in the third field to enable algorithm acceleration.

FIG. 10B shows one embodiment of a bucket valid table (BVT) 305'. This table tracks which physical buckets in flash are valid in order to manage the scavenging of buckets into blocks for trimming. As one example, a field 306' labeled valid may be a compact bit array (1 bit/bucket). The size of the BVT is the total number of flash bucket entries, only a subset of which are in use by the BTT.

Figure 10C:
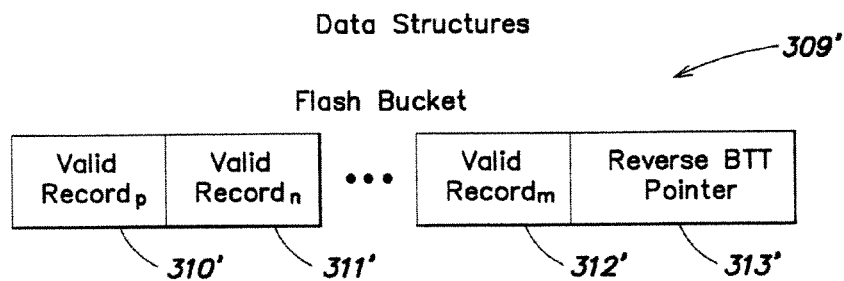

FIG. 10C illustrates one embodiment of flash bucket 309' having multiple records 310', 311', 312' . . . included in the bucket, along with a reverse BTT pointer 313' (a self-index into the bucket translation table 17'). Thus, each bucket contains a set of one or more records and a reverse pointer for updating the BTT when flash buckets (e.g., pages) are inserted, moved or deleted. Each element of the bucket (record or pointer) may have redundant content added, such as additional ECC bits, to improve the individual reliability of the data structures and significantly increase the useful life of the storage devices. For example, an optional sequence number field may be added to flash bucket 309' for performing data consistency checking during power fail events; other optimization flags may be provided as well.

Because the record size is small relative to the bucket size, this provides an opportunity (optional) to implement additional error recovery information on an individual record basis. This optional feature would improve the overall reliability of the solution by increasing the number of bit errors and faults which may be corrected and thus increase the effective operating lifetime of the underlying storage technology.

Figure 10D:
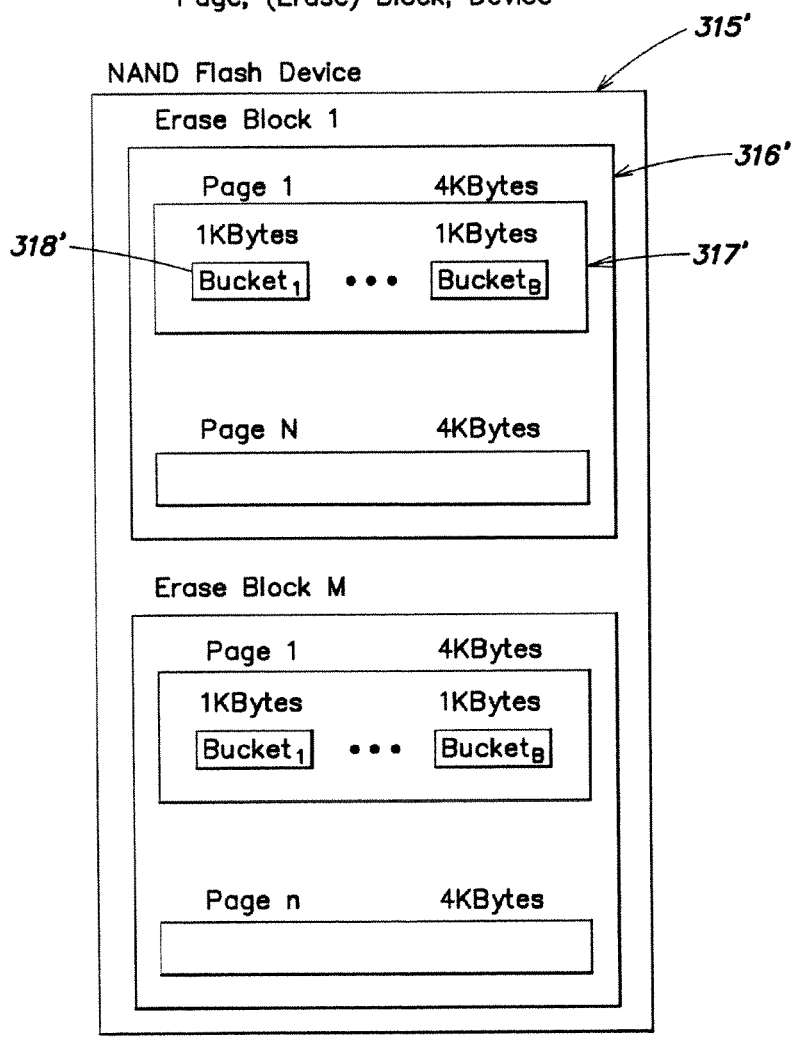

FIG. 10D shows one example of a SLC NAND flash device 315' containing multiple e0rase blocks 316' (1 to M). Each erase block includes multiple pages 317' (1 to N). In this example, each page is 4 KB and each page includes multiple buckets 318' (1 to B), each bucket being 1 KB. In this example, the device supports partial page writes.

A bucket represents a minimum write size of the flash device. Typically, a bucket would be a page. If partial page writes are allowed, then one or more buckets per flash page may be provided, such as a four partial page SLC NAND device supporting four buckets per page.

Multiple flash pages are provided per erase block. There are multiple erase blocks per flash devices, and each block is individually erased.

The typical flash subsystem consists of multiple flash devices. NAND flash devices are written sequentially once per page (or partial page) within a given block between erase operations, with multiple blocks available for writing and reading simultaneously.

6. Process Flow Charts

FIG. 11 illustrates one embodiment of a lookup operation process for verifying the presence of a key and returning associated satellite data. In step one 41', a lookup key is input to a lookup function. In step two 42', the lookup function f(key) generates a logical bucket identifier that supports (e.g., speeds up) a hash table lookup. The logical bucket identifier is input to a translation function, which in step three 43' is mapped to a flash memory (physical bucket) location, via the bucket translation table (BTT) 17'. In step four 44', the target bucket in flash memory is read 45a' from flash memory, unless the bucket is stored in cache, in which case it can be read 45b' from cache 23'. In step six 46', the satellite (record) data for the key is returned to the indexing algorithm.

FIG. 12 shows one embodiment of an insert operation process. A first step 71' inputs a key to the lookup function. In step two 72', the lookup function f(key) generates an index, here a logical bucket identifier. In step three 73', the bucket identifier is input to a translation function which maps the bucket identifier to a flash memory physical bucket location where the insert should occur, utilizing the bucket translation table (BTT) 17'. In step four 74', the insert process receives the target bucket location from the translation function. In step five 75', the insert process reads the target bucket 22' from an erase block 21a' of flash memory 75a', or from cache 75b'. In step six 76', the insert process inserts the record entry into the target bucket and writes the modified bucket to cache. In step seven 77', multiple bucket entries (including the modified target bucket) are read from cache 73' by the insert process. In step eight 78', the insert process writes the modified target bucket and other buckets read from cache to new locations (pages in erase block 21b') in flash 26'. In step nine 79', the insert process updates the bucket translation table 17' with the new locations for all buckets moved from cache to flash 79a', and also updates the bucket valid entries in BVT 79b' for all buckets moved. In step ten 80', the insert process marks the moved cache entries read only (available). In step eleven 81', the insert process marks the original flash buckets (now moved to a new erase block) as free.

FIG. 13 illustrates one embodiment of a delete operation process. In a first step 91', a key is provided to a lookup function. In step two 92', the lookup function f(key) generates an index, here a logical bucket identifier. In step three 93', the bucket identifier is provided to the translation function, which utilizes the bucket translation table 17' to map the bucket identifier to a physical flash memory bucket location. In step four 94', the delete process receives the flash memory location. In step five 95', the target bucket is read from flash. In step six 96', the process deletes the original record entry in the bucket and writes the modified bucket (with the deleted entry) to cache 23'. In step seven 97', a group (collection) of buckets are read from cache. In step eight 98', the updated target bucket and other buckets read from cache 23' are written sequentially to a contiguous set of free pages in flash. In step nine 99', the delete process updates the bucket translation table 17' with the new locations in flash for all moved buckets 99a', and updates their valid status in the BVT 99b'. In step ten 100', the delete process marks the cache entries as read only. In step eleven 101', the delete process marks the original flash buckets now moved to a new location in flash as free.

FIG. 14 illustrates one embodiment of an update operation process for modifying a record in an index stored in flash memory. In a first step 51', a key is provided as input to a lookup function. In step two 52', the lookup function f(key) generates an index, here a logical bucket identifier. The bucket identifier is input to a translation function. In step three 53', the translation function maps the bucket identifier to a physical bucket in flash memory where the update should occur, utilizing the bucket translation table 17'. In step five 55', the target bucket is read from flash 55a' or from cache 55b'. In step six 56', after updating the entry, the updated bucket is written to cache 23'. In step seven 57', a group of buckets are read from the cache 23' and in a step eight 58', written sequentially from cache to a new location in flash memory 26'. In step nine 59', the update process updates the bucket translation table 17' with the new locations for all buckets moved 59a', and updates their valid status in the BVT 59b'. In step ten 60', the update process marks the moved entries as read only in cache 23' (and thus available to be written over). Finally, in step eleven 61', the update process marks the original flash buckets, now moved to a new location, as free (available).

FIG. 15A illustrates one embodiment of a process for generating free erasure blocks, where a demand read (generated by an upstream indexing operation such as a lookup, insert or modify) reads additional buckets in the same erase block (as the target bucket). In FIG. 15A, the process is illustrated with an update request. In step one 111', a key is provided to a lookup function. In step two 112', the lookup function f(key) generates an index, here a logical bucket identifier. In step three 113', the bucket identifier is mapped to a physical target bucket location in flash. In step four 114', the update and scavenge process receives the target flash memory location. In step five 115', the process identifies all valid buckets in the same erase block as the target bucket. In step six, 116', the update process reads the target bucket and all identified valid buckets from the flash block containing the target bucket. In step seven 117', the process updates the record entry in the target bucket and writes all valid buckets from the flash block to cache 23'. In step eight 118', the update process reads a group of blocks from cache. In step nine 119', the update process writes the updated target bucket and other buckets read from cache 23' to flash 26'. In step ten 120', the update process updates the bucket translation table 17' with the new locations for all buckets moved (written from cache to new erasure block 21b' in flash) 120a', and updates the bucket entries in the BVT 120b'. In step eleven 121', the update process marks the now stale cache entries as read only. In step twelve 122', the update process marks the original flash block (all buckets in the target block) as free.

FIG. 15B illustrates a particular embodiment of the random read process just described for generating free erase blocks.

In this embodiment, a displacement hashing indexing algorithm 125' generates logical buckets 126'. The logical bucket size as viewed by the indexing algorithm, is tied to the flash erase block size so as to render compatible the indexing algorithm and flash memory. These buckets will be randomly read as a result of index reads and updates.

A bucket translation (indirection) table 127' translates a logical bucket index into a physical flash device bucket location. This indirection table enables the indexing algorithm to work randomly, for reads, writes and updates, and yet have large sequential writes performed at the flash device level. Preferably, the indirection table is stored in persistent memory, but it can be rebuilt as necessary if stored in volatile memory.

The output of the indirection table, namely the physical device bucket location, is provided as input to a fully associative bucket cache 128'. In this embodiment, if, the contents of an empty erase block fifo 129' is below a high water mark 0, then the entire erase block (containing the target 4 KB bucket) is read.

The erase blocks host logical buckets, a typical configuration being one erase block holding 16 of the 4 KB logical buckets. The physical device is configured for a load, e.g., 90%, meaning that 90% of the buckets are in use. Caching and victimization (eviction) are used to pack (concentrate) logical buckets in the flash memory so that most of the 10% of the remaining buckets are concentrated in free erase blocks.

The cache victimization (eviction process) takes 16 buckets, collected in cache, and writes out the 16 buckets from cache to a free erase block 130'. Because the erase blocks are touched randomly by the random read operations, the read operations can be used to generate free erase blocks. Use of a cryptographic hash function for generating the logical bucket identifiers, will increase the random nature of the read operations and thus improve the random read generation of free erase blocks.

FIGS. 16A and 16B illustrate an alternative scavenging process for generating free erase blocks. This scavenging process is not a part of any indexing operation. Rather, it is implemented as part of a lower level device management layer. In this process, a group (some or all) of the physical buckets in a flash erase block are read directly from flash and the bucket valid table 27' is used to determine which buckets in the erase block are valid.

As illustrated in FIG. 16A, in step one 220', a scavenging process 25' reads complete erase block 21a'. In step two 222', the scavenging process uses the bucket valid table 27' to identify all buckets of those read that are valid. In step three 224', for each valid bucket, the logical bucket identifier is extracted from the bucket. In step four 226', the valid buckets are stored in cache 23', each indexed by its logical bucket identifier.

FIG. 16B shows an example where in step one, the scavenging process 25' reads buckets [94, 97] inclusive. In step two, the process determines that buckets at 95 and 96 are valid. The valid buckets are shown in the bucket valid table designated by a "1", and the non-valid buckets by a "0". In step three, the logical bucket identifiers for buckets 95 and 96, namely tags 23 and 49 respectively, are extracted from the buckets. In step four, the two tags, and their respective buckets 95 and 96 are inserted into cache using their respective tags 23, 49 as the index.

7. Stack Level View and Implementation

Another more specific example of the invention will now be described with respect to FIGS. 17-24.

FIG. 17 shows a six layer view or stack 200' for illustrating an implementation of the present invention in which a flash adaptation layer 207' adapts an IO usage profile view desired by an indexing algorithm 203, which is a very different view than desired by the physical flash memory device 211'. At the top level 201', a dictionary (index) of records is provided, for which certain indexing operations 204' (lookup, delete, insert and modify a record) are required. An indexing algorithm layer 203' implements the dictionary with one or more indexing algorithms, e.g., a cuckoo displacement hashing algorithm being one example. The indexing algorithm has a view of how the keys to the index will be stored by an index persistence layer 205'. The indexing view is a logical view, specifying logical address locations. The view further assumes that there will be uniform access to the index with respect to size, alignment and timing, and that the index is stored on mutable (stable) storage.

The index persistence layer 205' will present logical bucket operations 206' for reading and writing, to physical buckets which store the records of the index. These logical bucket operations 206' are presented to a flash adaptation layer 207', which as previously described, translates the logical buckets (of the indexing process) to physical bucket locations on the flash storage device. The flash adaption layer thus adapts the view and IO usage profile desired by the indexing algorithm above, to the very different view desired by the physical storage device (flash memory 211') below. Here the physical bucket operations 208' include random reads and aggregated (block sequential) writes, which constitute a non-uniform model of bucket access. The physical bucket operations in this example may further include trim commands.

The physical bucket operations are implemented by a device management layer 209' which tracks and coordinates the resources on the physical flash device. These physical device operations 210' here include random reads, large sequential writes, and trim commands.

The physical device layer 211' is characterized by its non-uniform read and write and immutability with respect to size, alignment and timing. Examples of such physical devices include raw flash, phase-change, an SSD, and/or flash with a flash file system residing on the device.

The present invention enables additional optional enhancements below the device management layer such as:

The model of bucket trimming (fine page trimming) and tracking buckets within a page enables better Erase Block management if incorporated directly into a flash file system of an SSD or equivalent storage device.

The mapping of buckets onto flash pages is an abstraction. Buckets could map to partial-pages for SLC NAND to increase the lifetime of those devices by minimizing the amount of data written to the flash for each change. Buckets can also map onto multiple flash pages if this was beneficial to the overall system performance.

FIG. 18 shows one example of an index record. The record 140' is 32 bytes in total, including a first 20 byte field 141' for storing a fingerprint (key). A fingerprint is preferably a cryptographic hash digest of the data content, e.g., an SHA-1 hash algorithm. For ease of illustration, rather than typing the fingerprint in hex digits such as "AB92345E203 . . . " an individual fingerprint will be designated in FIGS. 19-22 by a single capital letter such as P, Q, R, S, T. These capital letters will also act as a proxy for the entire record, again to simplify for purposes of illustration. The fields of the record also include a two byte reference count field 142', a five byte physical block address field 143', a one byte flags field 144', and a four byte miscellaneous field 145'. The PBA field 143' contains a pointer to the physical block address of the data stored on disk, for the designated fingerprint 141'. The reference count tracks the number of references to the data stored on disk.

In accordance with one embodiment of the invention, the fingerprint 141' from the index record is used as an input key to the lookup function f(key) previously described (FIG. 9). In this example, the function f(key) comprises a set of four hash functions $H_0$, $H_1$, $H_2$, and $H_3$. Generally, one can use any set of two or more hash functions. The hash function $H_x$ maps the fingerprint to a range [0, N−1] inclusive, wherein N is the size of the hash table. Given that in this example the fingerprints themselves are hashes, one can extract BitFields to generate the following family of four hash values:

$H_0(x)=x<0:31>$ mod N
$H_1(x)=x<032:63>$ mod N
$H_2(x)=x<064:95>$ mod N
$H_3(x)=x<096:127>$ mod N The BitField width extracted is greater than or equal to $\log_2$(N). Any combination of disjointed bits can be used, subject to the $\log_2$ (N) constraint. As illustrated in FIG. 18, only the fingerprint in the first field 141' is hashed, to form the key. The remaining content (fields 142'-145') of the record 140' comprise a value or payload.

FIG. 19 illustrates one example of a displacement hashing indexing algorithm known as cuckoo hashing. For ease of illustration, only two functions are used FIG. 19A shows a 2×3 grid in which fingerprint P generates hash values 2 and 5 from the functions $H_0(x)$ and $H_1(x)$, respectively, while the fingerprint Q generates hash values 1 and 3 from these same functions. The cuckoo hashing algorithm will select from among the two alternative hash values for placing P and Q in one of the seven slots labeled 0-6 (FIG. 19B). P can go in one of two locations, 2 or 5, and Q can go in one of two locations, 1 or 3. The algorithm puts Q in the lowest empty slot 1 and P in slot 2, as shown in FIG. 19C. While in this example the record container is referred to as a slot holding one record, it should be understood that the invention is not so limited; indexing algorithms also view a bucket, holding multiple records, as a container. Here a single record slot is used to simplify the explanation.

Now, another fingerprint R is provided which generates hash values of 1 and 2 from the same hash functions (see table in FIG. 19D). The hashing algorithm will place R in the left location, namely slot 1, displacing the current entry Q (FIG. 19E). Q will now be moved to the other optional location specified by $H_1(Q)$, namely location 3. The algorithm will keep displacing records until each record lands in an empty slot.

In this example, to accomplish the "insert R" operation, the indexing algorithm generates the following read and write requests:

read 1 (gets Q)
read 2 (gets P)

write 1 (write R)
read 3 (validity check)
write 3 (Q)

The first two reads are used to validate that R is not already present in the index. The validity check (read 3) determines whether slot number 3 is empty; if so, then Q can be written to slot 3 and the algorithm is done as no entry was rewritten in slot 3. If slot 3 were not empty, then the current entry in slot 3 would need to be moved to another slot. The contents of slot 3 are known if we have a Bitmap; otherwise, we need to read the entry in slot 3 to determine its status. Each entry contains a valid bit indicating if that entry is valid. Valid means it is in use (and the current occupant of the location has to be displaced). Not valid means the location is empty, and the record being processed can be written there. The contents of the valid bits can also be stored in a separate Bitmap, at the expense of some memory.

The cuckoo hashing algorithm is recursive, in that it keeps writing over entries, displacing the previous content, until it lands on an empty entry. In practice, this process rarely exceeds one displacement.

The indexing algorithm has both bucket and individual record operations. The indexing algorithm is described above (in FIG. 19) as placing one record in one container (slot), but it is understood by the indexing algorithm that the records may also be aggregated into buckets, i.e., buckets containing multiple records. Thus, the above example is nonlimiting and meant to illustrate generally record operations.

As previously described, because the reading and writing of individual records is not efficient to flash memory, the individual records are aggregated into buckets. FIG. 20 illustrates four such buckets, each containing two or more records, i.e., bucket $B_0$ with record locations 0 and 1, $B_1$ with record locations 2 and 3, $B_2$ with record locations 4 and 5, and $B_3$ with record locations 6 and x. The bucket size is a function of (and preferably is equal to) the minimum write size dictated by the flash device, i.e., either full page write or partial page write. A typical bucket size may be 4 KB. No specific ordering of records is required within the bucket—the entire bucket is searched for a valid record during the lookup operation, so that the record could be inserted at any point within the bucket. When displacing, according to the cuckoo hashing algorithm, an entry in the bucket can be displaced at random. The indexing algorithm thus writes logical buckets in what appear to be random locations, one at a time, that are eventually aggregated by the flash adaptation layer into larger physically contiguous (sequential) writes to the flash device.

FIG. 21 illustrates one example of a bucket entry 160'. A 4 KB bucket size is based on the underlying device minimum write size, here a 4 KB page. The 4 KB bucket includes a 4 byte first field 161' that specifies the number of records in the bucket entry. A 4 byte tag field 162' specifies the logical bucket identifier. This identifier (tag) is a logical address, not a physical one. The translation table maps the algorithm bucket address (ABA) to a flash bucket address FBA. The cache operates as a virtual cache (in CPU terminology), with each cache line (entry) identified by a tag, an ABA in this case. As the algorithm requests records all it knows in going through the cache is that the ABA requested is cached; where it is mapped to (the FBA) is at the bottom end of the cache (e.g., see the reverse pointer 313' to the BTT, in FIG. 10C). The bucket includes field 163' for holding a plurality of records $R_0, R_1, R_2 \ldots$, each record being 32 bytes in size. In this example, a 4 KB bucket will hold: (4096−4−4)/32 records, i.e., approximately 127 records per bucket.

FIG. 22 is a schematic diagram of a flash memory device 164' illustrating the relative sizes of a bucket, page and erase block in one embodiment. The physical flash device is a chip (package) 165' that is 2 GB in size. On the chip, there are two die (silicon wafers) 166a', 167b'. On each die, there may be $2^{14}$ erase blocks, each erase block 167' typically being 64 KB. A page 168' is the minimum size that can be written, here 4 KB, and determines the size of the bucket 169', also 4 KB, as used higher up in the stack (see FIG. 17).

FIG. 23 illustrates select components according to one embodiment of a device management layer (209' in FIG. 17) for tracking and coordinating the resources on the physical flash device. FIG. 23A shows (at the top) a plurality of pages (buckets) 170', followed by a page allocation map 171' indicating which pages are valid (1 is valid, 0 is not valid). Below this is a pending trim map 172', of pages to be trimmed in the future, but not yet done so. The page allocation and pending trim maps can be used in various embodiments of the invention as previously described, for determining whether a bucket holds valid data (see the bucket valid table 27' illustrated in FIG. 9).

FIG. 23B illustrates one example of an erase block descriptor table 175', indexed by erase block index. Each erase block descriptor entry 176' includes a plurality of fields, including number erased 177', number of partial writes 178', number of partial reads 179', number of full reads 180', number of full writes 181, and number of errors 182'. This information can be used in generating free erase blocks as previously described in various embodiments of the invention.

The invention claimed is:

1. A method of accessing a file stored within a file system, said file system being stored as objects in an object store on one or more computer storage devices, the file having a file name and a corresponding inode number, and the object store comprising a plurality of objects including at least one of each of:
   a directory object,
   an inode map object,
   a file object, and
   a data object;
each object having as its object name a globally unique object fingerprint derived from its content;
the method comprising steps of:
   accessing a directory object using its fingerprint, the directory object comprising a mapping of file names and their corresponding inode numbers;
   searching the directory object using the file's name to obtain the corresponding inode number;
   accessing an inode map object using its fingerprint, the inode map object comprising a mapping of file object fingerprints and their corresponding inode numbers;
   using the inode map object to translate the corresponding inode number from the directory object into the file object fingerprint;
   accessing the file object using its fingerprint, the file object comprising a mapping table of object fingerprints for data objects of the file;
   wherein the data objects of the file are accessible in the object store via the mapping table of the file object.

2. The method of claim 1: wherein the fingerprint of the inode map object comprises a snapshot of the file system.

3. The method of claim 1, including:
   publishing the inode map object fingerprint to another computer system.

4. The method of claim 1, including:
   performing disaster recovery using the inode map object fingerprint as a snapshot of the file system.

5. The method of claim 1, wherein the inode map object includes a fingerprint of a previous inode map object.

6. The method of claim 5, wherein the previous inode map object fingerprints comprise a history of snapshots of the file system.

7. The method of claim 1, wherein the file object mapping table comprises a linear list, a tree structure or an indirection table.

8. The method of claim 1, including:
generating a transaction log of object activity, including reads, writes, deletes and reference count updates.

9. The method of claim 1, including:
adding, modifying or deleting a data object of the file and generating a new file object fingerprint.

10. The method of claim 1, including:
utilizing hardware acceleration to perform one or more of object naming, compression and encryption.

11. The method of claim 1, including:
maintaining a reference count for each object, and updating the object's reference count when references to the object are added or deleted.

12. The method of claim 1, including: wherein the objects further include a root object having an object fingerprint derived from all of the objects in the file system, such that every object in the file system is accessible through the root object, and when the content of a particular file object or a particular data object is changed, propagating the change up to the root object.

* * * * *